US009502025B2

(12) United States Patent
Kennewick et al.

(10) Patent No.: US 9,502,025 B2
(45) Date of Patent: Nov. 22, 2016

(54) SYSTEM AND METHOD FOR PROVIDING A NATURAL LANGUAGE CONTENT DEDICATION SERVICE

(75) Inventors: Mike Kennewick, Bellevue, WA (US); Lynn Elise Armstrong, Woodinville, WA (US)

(73) Assignee: VoiceBox Technologies Corporation, Bellevue, WA (US)

( * ) Notice: Subject to any disclaimer, the term of this patent is extended or adjusted under 35 U.S.C. 154(b) by 1345 days.

(21) Appl. No.: 12/943,699

(22) Filed: Nov. 10, 2010

(65) Prior Publication Data

US 2011/0112921 A1    May 12, 2011

Related U.S. Application Data

(60) Provisional application No. 61/259,820, filed on Nov. 10, 2009.

(51) Int. Cl.
G10L 15/00 (2013.01)
G10L 15/18 (2013.01)
G06Q 30/06 (2012.01)
G06F 17/28 (2006.01)

(52) U.S. Cl.
CPC .............. *G10L 15/18* (2013.01); *G06F 17/28* (2013.01); *G06Q 30/0601* (2013.01)

(58) Field of Classification Search
None
See application file for complete search history.

(56) References Cited

U.S. PATENT DOCUMENTS

| | | | |
|---|---|---|---|
| 4,430,669 A | 2/1984 | Cheung | 358/122 |
| 5,027,406 A | 6/1991 | Roberts et al. | 381/43 |
| 5,155,743 A | 10/1992 | Jacobs | 375/28 |
| 5,208,748 A | 5/1993 | Flores et al. | 364/419 |
| 5,274,560 A | 12/1993 | LaRue | 364/444 |
| 5,357,596 A | 10/1994 | Takebayashi et al. | 395/2.84 |
| 5,377,350 A | 12/1994 | Skinner | 395/600 |
| 5,386,556 A | 1/1995 | Hedin et al. | 395/600 |
| 5,424,947 A | 6/1995 | Nagao et al. | 364/419.08 |
| 5,471,318 A | 11/1995 | Ahuja et al. | 358/400 |

(Continued)

FOREIGN PATENT DOCUMENTS

| | | |
|---|---|---|
| EP | 1 320 043 A2 | 6/2003 |
| EP | 1 646 037 | 4/2006 |

(Continued)

OTHER PUBLICATIONS

Reuters, "IBM to Enable Honda Drivers to Talk to Cars", Charles Schwab & Co., Inc., Jul. 28, 2002, 1 page.

(Continued)

*Primary Examiner* — John Hayes
*Assistant Examiner* — Tim Hale
(74) *Attorney, Agent, or Firm* — Sheppard Mullin Richter & Hampton LLP

(57) ABSTRACT

The system and method described herein may provide a natural language content dedication service in a voice services environment. In particular, providing the natural language content dedication service may generally include detecting multi-modal device interactions that include requests to dedicate content, identifying the content requested for dedication from natural language utterances included in the multi-modal device interactions, processing transactions for the content requested for dedication, processing natural language to customize the content for recipients of the dedications, and delivering the customized content to the recipients of the dedications.

19 Claims, 8 Drawing Sheets

(56) References Cited

U.S. PATENT DOCUMENTS

| | | | |
|---|---|---|---|
| 5,475,733 A | 12/1995 | Eisdorfer et al. | 379/52 |
| 5,488,652 A | 1/1996 | Bielby et al. | 379/88 |
| 5,499,289 A | 3/1996 | Bruno et al. | 379/220 |
| 5,500,920 A | 3/1996 | Kupiec | 395/2.79 |
| 5,517,560 A | 5/1996 | Greenspan | 379/114 |
| 5,533,108 A | 7/1996 | Harris et al. | 379/201 |
| 5,537,436 A | 7/1996 | Bottoms et al. | 375/222 |
| 5,539,744 A | 7/1996 | Chu et al. | 370/60 |
| 5,557,667 A | 9/1996 | Bruno et al. | 379/201 |
| 5,563,937 A | 10/1996 | Bruno et al. | 379/201 |
| 5,577,165 A | 11/1996 | Takebayashi et al. | 395/2.84 |
| 5,590,039 A | 12/1996 | Ikeda et al. | 395/759 |
| 5,608,635 A | 3/1997 | Tamai | 364/449.3 |
| 5,617,407 A | 4/1997 | Bareis | 369/275.3 |
| 5,633,922 A | 5/1997 | August et al. | 379/220 |
| 5,675,629 A | 10/1997 | Raffel et al. | 379/58 |
| 5,696,965 A | 12/1997 | Dedrick | 395/610 |
| 5,708,422 A | 1/1998 | Blonder et al. | 340/825.34 |
| 5,721,938 A | 2/1998 | Stuckey | 395/754 |
| 5,722,084 A | 2/1998 | Chakrin et al. | 455/551 |
| 5,740,256 A | 4/1998 | Castello Da Costa et al. | 361/94.7 |
| 5,742,763 A | 4/1998 | Jones | 395/200.3 |
| 5,748,841 A | 5/1998 | Morin et al. | 395/2.66 |
| 5,748,974 A | 5/1998 | Johnson | 395/759 |
| 5,752,052 A | 5/1998 | Richardson et al. | 395/759 |
| 5,754,784 A | 5/1998 | Garland et al. | 395/200.49 |
| 5,761,631 A | 6/1998 | Nasukawa | 704/9 |
| 5,774,859 A | 6/1998 | Houser et al. | 704/275 |
| 5,794,050 A | 8/1998 | Dahlgren et al. | 395/708 |
| 5,794,196 A | 8/1998 | Yegnanarayanan et al. | 704/255 |
| 5,797,112 A | 8/1998 | Komatsu et al. | 701/201 |
| 5,799,276 A | 8/1998 | Komissarchik et al. | 704/251 |
| 5,802,510 A | 9/1998 | Jones | 707/2 |
| 5,832,221 A | 11/1998 | Jones | 375/200.36 |
| 5,839,107 A | 11/1998 | Gupta et al. | 704/270 |
| 5,848,396 A | 12/1998 | Gerace | 705/10 |
| 5,855,000 A | 12/1998 | Waibel et al. | 704/235 |
| 5,867,817 A | 2/1999 | Catallo et al. | 704/255 |
| 5,878,385 A | 3/1999 | Bralich et al. | 704/9 |
| 5,878,386 A | 3/1999 | Coughlin | 704/10 |
| 5,892,813 A | 4/1999 | Morin et al. | 379/88.01 |
| 5,892,900 A * | 4/1999 | Ginter et al. | 726/26 |
| 5,895,464 A | 4/1999 | Bhandari et al. | 707/3 |
| 5,895,466 A | 4/1999 | Goldberg et al. | 707/5 |
| 5,897,613 A | 4/1999 | Chan | 704/270 |
| 5,902,347 A | 5/1999 | Backman et al. | 701/200 |
| 5,911,120 A | 6/1999 | Jarett et al. | 455/417 |
| 5,918,222 A | 6/1999 | Fukui et al. | 707/1 |
| 5,926,784 A | 7/1999 | Richardson et al. | 704/9 |
| 5,933,822 A | 8/1999 | Braden-Harder et al. | 707/5 |
| 5,953,393 A | 9/1999 | Culbreth et al. | 379/88.25 |
| 5,960,397 A | 9/1999 | Rahim | 704/244 |
| 5,960,399 A | 9/1999 | Barclay et al. | 704/270 |
| 5,960,447 A | 9/1999 | Holt et al. | 707/500 |
| 5,963,894 A | 10/1999 | Richardson et al. | 704/9 |
| 5,963,940 A | 10/1999 | Liddy et al. | 707/5 |
| 5,987,404 A | 11/1999 | Della Pietra et al. | 704/9 |
| 5,991,721 A | 11/1999 | Asano et al. | 704/270 |
| 5,995,119 A | 11/1999 | Cosatto et al. | 345/473 |
| 5,995,928 A | 11/1999 | Nguyen et al. | 704/251 |
| 6,009,382 A | 12/1999 | Martino et al. | 704/1 |
| 6,014,559 A | 1/2000 | Amin | 455/413 |
| 6,018,708 A | 1/2000 | Dahan et al. | 704/244 |
| 6,021,384 A | 2/2000 | Gorin et al. | 704/1 |
| 6,035,267 A | 3/2000 | Watanabe et al. | 704/1 |
| 6,044,347 A | 3/2000 | Abella et al. | 704/272 |
| 6,049,602 A | 4/2000 | Foladare et al. | 379/265 |
| 6,049,607 A | 4/2000 | Marash et al. | 379/410 |
| 6,058,187 A | 5/2000 | Chen | 380/21 |
| 6,067,513 A | 5/2000 | Ishimitsu | 704/233 |
| 6,076,059 A | 6/2000 | Glickman et al. | 704/260 |
| 6,078,886 A | 6/2000 | Dragosh et al. | 704/270 |
| 6,081,774 A | 6/2000 | De Hita et al. | 704/9 |
| 6,085,186 A | 7/2000 | Christianson et al. | 707/3 |
| 6,101,241 A | 8/2000 | Boyce et al. | 379/88.01 |
| 6,108,631 A | 8/2000 | Ruhl | 704/270 |
| 6,119,087 A | 9/2000 | Kuhn et al. | 704/270 |
| 6,122,613 A | 9/2000 | Baker | 704/235 |
| 6,134,235 A | 10/2000 | Goldman et al. | 370/352 |
| 6,144,667 A | 11/2000 | Doshi et al. | 370/401 |
| 6,144,938 A | 11/2000 | Surace et al. | 704/257 |
| 6,154,526 A | 11/2000 | Dahlke et al. | 379/88.03 |
| 6,160,883 A | 12/2000 | Jackson et al. | 379/230 |
| 6,167,377 A | 12/2000 | Gillick et al. | 704/240 |
| 6,173,266 B1 | 1/2001 | Marx et al. | 704/270 |
| 6,173,279 B1 | 1/2001 | Levin et al. | 707/5 |
| 6,175,858 B1 | 1/2001 | Bulfer et al. | 709/206 |
| 6,185,535 B1 | 2/2001 | Hedin et al. | 704/270 |
| 6,188,982 B1 | 2/2001 | Chiang | 704/256 |
| 6,192,110 B1 | 2/2001 | Abella et al. | 379/88.01 |
| 6,192,338 B1 | 2/2001 | Haszto et al. | 704/257 |
| 6,195,634 B1 | 2/2001 | Dudemaine et al. | 704/231 |
| 6,195,651 B1 | 2/2001 | Handel et al. | 707/2 |
| 6,199,043 B1 | 3/2001 | Happ | 704/272 |
| 6,208,964 B1 | 3/2001 | Sabourin | 704/244 |
| 6,208,972 B1 | 3/2001 | Grant et al. | 704/275 |
| 6,219,346 B1 | 4/2001 | Maxemchuk | 370/338 |
| 6,219,643 B1 | 4/2001 | Cohen et al. | 704/257 |
| 6,226,612 B1 | 5/2001 | Srenger et al. | 704/256 |
| 6,233,556 B1 | 5/2001 | Teunen et al. | 704/250 |
| 6,233,559 B1 | 5/2001 | Balakrishnan | 704/275 |
| 6,233,561 B1 | 5/2001 | Junqua et al. | 704/277 |
| 6,236,968 B1 | 5/2001 | Kanevsky et al. | 704/275 |
| 6,246,981 B1 | 6/2001 | Papineni et al. | 704/235 |
| 6,246,990 B1 | 6/2001 | Happ | 704/275 |
| 6,266,636 B1 | 7/2001 | Kosaka et al. | 704/244 |
| 6,269,336 B1 | 7/2001 | Ladd et al. | 704/270 |
| 6,272,455 B1 | 8/2001 | Hoshen et al. | 704/1 |
| 6,275,231 B1 | 8/2001 | Obradovich | 345/349 |
| 6,278,968 B1 | 8/2001 | Franz et al. | 704/3 |
| 6,288,319 B1 | 9/2001 | Catona | 84/609 |
| 6,292,767 B1 | 9/2001 | Jackson et al. | 704/1 |
| 6,301,560 B1 | 10/2001 | Masters | 704/251 |
| 6,308,151 B1 | 10/2001 | Smith | 704/235 |
| 6,314,402 B1 | 11/2001 | Monaco et al. | 704/275 |
| 6,356,869 B1 | 3/2002 | Chapados et al. | 704/275 |
| 6,362,748 B1 | 3/2002 | Huang | 340/901 |
| 6,366,882 B1 | 4/2002 | Bijl et al. | 704/235 |
| 6,366,886 B1 | 4/2002 | Dragosh et al. | 704/270.1 |
| 6,374,214 B1 | 4/2002 | Friedland et al. | 704/235 |
| 6,377,913 B1 | 4/2002 | Coffman et al. | 704/8 |
| 6,381,535 B1 | 4/2002 | Durocher et al. | 701/202 |
| 6,385,596 B1 | 5/2002 | Wiser et al. | 705/51 |
| 6,385,646 B1 | 5/2002 | Brown et al. | 709/217 |
| 6,393,403 B1 | 5/2002 | Majaniemi | 704/275 |
| 6,393,428 B1 | 5/2002 | Miller et al. | 707/102 |
| 6,397,181 B1 | 5/2002 | Li et al. | 704/256 |
| 6,404,878 B1 | 6/2002 | Jackson et al. | 379/221.01 |
| 6,405,170 B1 | 6/2002 | Phillips et al. | 704/270 |
| 6,408,272 B1 | 6/2002 | White et al. | 704/270.1 |
| 6,411,810 B1 | 6/2002 | Maxemchuk | 455/453 |
| 6,415,257 B1 | 7/2002 | Junqua et al. | 704/275 |
| 6,418,210 B1 | 7/2002 | Sayko | 379/142.15 |
| 6,420,975 B1 | 7/2002 | DeLine et al. | 340/815.4 |
| 6,429,813 B2 | 8/2002 | Feigen | 342/357.13 |
| 6,430,285 B1 | 8/2002 | Bauer et al. | 379/265.01 |
| 6,430,531 B1 | 8/2002 | Polish | 704/257 |
| 6,434,523 B1 | 8/2002 | Monaco | 704/257 |
| 6,434,524 B1 | 8/2002 | Weber | 704/257 |
| 6,434,529 B1 | 8/2002 | Walker et al. | 704/275 |
| 6,442,522 B1 | 8/2002 | Carberry et al. | 704/257 |
| 6,446,114 B1 | 9/2002 | Bulfer et al. | 709/206 |
| 6,453,153 B1 | 9/2002 | Bowker et al. | 455/67.4 |
| 6,453,292 B2 | 9/2002 | Ramaswamy et al. | 704/235 |
| 6,456,711 B1 | 9/2002 | Cheung et al. | 379/265.09 |
| 6,456,974 B1 | 9/2002 | Baker et al. | 704/270.1 |
| 6,466,654 B1 | 10/2002 | Cooper et al. | 379/88.01 |
| 6,466,899 B1 | 10/2002 | Yano et al. | 704/1 |
| 6,470,315 B1 | 10/2002 | Netsch et al. | 704/256 |
| 6,498,797 B1 | 12/2002 | Anerousis et al. | 370/522 |
| 6,499,013 B1 | 12/2002 | Weber | 704/257 |
| 6,501,833 B2 | 12/2002 | Phillips et al. | 379/88.07 |
| 6,501,834 B1 | 12/2002 | Milewski et al. | 379/93.24 |

(56) References Cited

U.S. PATENT DOCUMENTS

| | | | |
|---|---|---|---|
| 6,505,155 B1 | 1/2003 | Vanbuskirk et al. | 704/246 |
| 6,510,417 B1 | 1/2003 | Woods et al. | 704/275 |
| 6,513,006 B2 | 1/2003 | Howard et al. | 704/257 |
| 6,522,746 B1 | 2/2003 | Marchok et al. | 379/406.03 |
| 6,523,061 B1 | 2/2003 | Halverson et al. | 709/202 |
| 6,532,444 B1 | 3/2003 | Weber | 704/257 |
| 6,539,348 B1 | 3/2003 | Bond et al. | 704/9 |
| 6,549,629 B2 | 4/2003 | Finn et al. | 381/92 |
| 6,553,372 B1 | 4/2003 | Brassell et al. | 707/5 |
| 6,556,970 B1 | 4/2003 | Sasaki et al. | 704/257 |
| 6,556,973 B1 | 4/2003 | Lewin | 704/277 |
| 6,560,576 B1 | 5/2003 | Cohen et al. | 704/270 |
| 6,560,590 B1 | 5/2003 | Shwe et al. | 706/55 |
| 6,567,778 B1 | 5/2003 | Chao Chang et al. | 704/257 |
| 6,567,797 B1 | 5/2003 | Schuetze et al. | 707/2 |
| 6,570,555 B1 | 5/2003 | Prevost et al. | 345/156 |
| 6,570,964 B1 | 5/2003 | Murveit et al. | 379/67.1 |
| 6,571,279 B1 | 5/2003 | Herz et al. | 709/217 |
| 6,574,597 B1 | 6/2003 | Mohri et al. | 704/251 |
| 6,574,624 B1 | 6/2003 | Johnson et al. | 707/5 |
| 6,578,022 B1 | 6/2003 | Foulger et al. | 706/45 |
| 6,581,103 B1 | 6/2003 | Dengler | 709/231 |
| 6,584,439 B1 | 6/2003 | Geilhufe et al. | 704/270 |
| 6,587,858 B1 | 7/2003 | Strazza | 707/102 |
| 6,591,239 B1 | 7/2003 | McCall et al. | 704/275 |
| 6,594,257 B1 | 7/2003 | Doshi et al. | 370/352 |
| 6,594,367 B1 | 7/2003 | Marash et al. | 381/92 |
| 6,598,018 B1 | 7/2003 | Junqua | 704/251 |
| 6,601,026 B2 | 7/2003 | Appelt et al. | 704/9 |
| 6,604,075 B1 | 8/2003 | Brown et al. | 704/270.1 |
| 6,604,077 B2 | 8/2003 | Dragosh et al. | 704/270.1 |
| 6,606,598 B1 | 8/2003 | Holthouse et al. | 704/275 |
| 6,611,692 B2 | 8/2003 | Raffel et al. | 455/552 |
| 6,614,773 B1 | 9/2003 | Maxemchuk | 370/337 |
| 6,615,172 B1 | 9/2003 | Bennett et al. | 704/257 |
| 6,622,119 B1 | 9/2003 | Ramaswamy et al. | 704/9 |
| 6,629,066 B1 | 9/2003 | Jackson et al. | 704/9 |
| 6,631,346 B1 | 10/2003 | Karaorman et al. | 704/9 |
| 6,631,351 B1 | 10/2003 | Ramachandran et al. | 704/270 |
| 6,633,846 B1 | 10/2003 | Bennett et al. | 704/257 |
| 6,643,620 B1 | 11/2003 | Contolini et al. | 704/270 |
| 6,650,747 B1 | 11/2003 | Bala et al. | 379/265.06 |
| 6,658,388 B1 | 12/2003 | Kleindienst et al. | 704/275 |
| 6,678,680 B1 | 1/2004 | Woo | 707/6 |
| 6,681,206 B1 | 1/2004 | Gorin et al. | 704/243 |
| 6,691,151 B1 | 2/2004 | Cheyer et al. | 709/202 |
| 6,701,294 B1 | 3/2004 | Ball et al. | 704/257 |
| 6,704,396 B2 | 3/2004 | Parolkar et al. | 379/88.17 |
| 6,704,576 B1 * | 3/2004 | Brachman et al. | 455/503 |
| 6,704,708 B1 | 3/2004 | Pickering | 704/235 |
| 6,708,150 B1 | 3/2004 | Hirayama et al. | 704/243 |
| 6,721,001 B1 | 4/2004 | Berstis | 348/231.3 |
| 6,721,706 B1 | 4/2004 | Strubbe et al. | 704/275 |
| 6,735,592 B1 | 5/2004 | Neumann et al. | 707/101 |
| 6,741,931 B1 | 5/2004 | Kohut et al. | 701/209 |
| 6,742,021 B1 | 5/2004 | Halverson et al. | 709/218 |
| 6,745,161 B1 | 6/2004 | Arnold et al. | 704/7 |
| 6,751,591 B1 | 6/2004 | Gorin et al. | 704/257 |
| 6,751,612 B1 | 6/2004 | Schuetze et al. | 707/4 |
| 6,754,485 B1 | 6/2004 | Obradovich et al. | 455/414.1 |
| 6,754,627 B2 | 6/2004 | Woodward | 704/235 |
| 6,757,544 B2 | 6/2004 | Rangarajan et al. | 455/456.1 |
| 6,757,718 B1 | 6/2004 | Halverson et al. | 709/218 |
| 6,795,808 B1 | 9/2004 | Strubbe et al. | 704/275 |
| 6,801,604 B2 | 10/2004 | Maes et al. | 379/88.17 |
| 6,801,893 B1 | 10/2004 | Backfried et al. | 704/257 |
| 6,829,603 B1 | 12/2004 | Chai et al. | 707/5 |
| 6,832,230 B1 | 12/2004 | Zilliacus et al. | 707/203 |
| 6,833,848 B1 | 12/2004 | Wolff et al. | 345/719 |
| 6,850,603 B1 | 2/2005 | Eberle et al. | 379/88.16 |
| 6,856,990 B2 | 2/2005 | Barile et al. | 707/10 |
| 6,865,481 B2 | 3/2005 | Kawazoe et al. | 701/211 |
| 6,868,380 B2 | 3/2005 | Kroeker | 704/240 |
| 6,877,001 B2 | 4/2005 | Wolf et al. | 707/3 |
| 6,877,134 B1 | 4/2005 | Fuller et al. | 715/500.1 |
| 6,901,366 B1 | 5/2005 | Kuhn et al. | 704/275 |
| 6,910,003 B1 | 6/2005 | Arnold et al. | 704/4 |
| 6,912,498 B2 | 6/2005 | Stevens et al. | 704/235 |
| 6,934,756 B2 | 8/2005 | Maes | 709/227 |
| 6,937,977 B2 | 8/2005 | Gerson | 704/201 |
| 6,944,594 B2 | 9/2005 | Busayapongchai et al. | 704/275 |
| 6,950,821 B2 | 9/2005 | Faybishenko et al. | 707/10 |
| 6,954,755 B2 | 10/2005 | Reisman | 707/10 |
| 6,959,276 B2 | 10/2005 | Droppo et al. | 704/226 |
| 6,968,311 B2 | 11/2005 | Knockeart et al. | 704/270 |
| 6,973,387 B2 | 12/2005 | Masclet et al. | 701/211 |
| 6,975,993 B1 | 12/2005 | Keiller | 704/275 |
| 6,980,092 B2 | 12/2005 | Turnbull et al. | 340/425.5 |
| 6,983,055 B2 | 1/2006 | Luo | 381/313 |
| 6,990,513 B2 | 1/2006 | Belfiore et al. | 709/203 |
| 6,996,531 B2 | 2/2006 | Korall et al. | 704/270 |
| 7,003,463 B1 | 2/2006 | Maes et al. | 704/270.1 |
| 7,016,849 B2 | 3/2006 | Arnold et al. | 704/275 |
| 7,020,609 B2 | 3/2006 | Thrift et al. | 704/270.1 |
| 7,024,364 B2 | 4/2006 | Guerra et al. | 704/270 |
| 7,027,586 B2 | 4/2006 | Bushey et al. | 379/265.09 |
| 7,027,975 B1 | 4/2006 | Pazandak et al. | 704/9 |
| 7,035,415 B2 | 4/2006 | Belt et al. | 381/92 |
| 7,043,425 B2 | 5/2006 | Pao | 704/211 |
| 7,054,817 B2 | 5/2006 | Shao | 704/270 |
| 7,058,890 B2 | 6/2006 | George et al. | 715/728 |
| 7,062,488 B1 | 6/2006 | Reisman | 707/8 |
| 7,069,220 B2 | 6/2006 | Coffman et al. | 704/275 |
| 7,072,834 B2 | 7/2006 | Zhou | 704/244 |
| 7,082,469 B2 * | 7/2006 | Gold et al. | 709/231 |
| 7,092,928 B1 | 8/2006 | Elad et al. | 706/60 |
| 7,107,210 B2 | 9/2006 | Deng et al. | 704/226 |
| 7,107,218 B1 | 9/2006 | Preston | 704/270 |
| 7,110,951 B1 | 9/2006 | Lemelson et al. | 704/270 |
| 7,127,400 B2 | 10/2006 | Koch | 704/270.1 |
| 7,130,390 B2 | 10/2006 | Abburi | 379/88.17 |
| 7,136,875 B2 | 11/2006 | Anderson et al. | 707/104.1 |
| 7,137,126 B1 | 11/2006 | Coffman et al. | 719/328 |
| 7,143,037 B1 | 11/2006 | Chestnut | 704/251 |
| 7,143,039 B1 | 11/2006 | Stifelman et al. | 704/270 |
| 7,146,319 B2 | 12/2006 | Hunt | 704/254 |
| 7,165,028 B2 | 1/2007 | Gong | 704/233 |
| 7,184,957 B2 | 2/2007 | Brookes et al. | 704/246 |
| 7,190,770 B2 | 3/2007 | Ando et al. | 379/88.01 |
| 7,197,069 B2 | 3/2007 | Agazzi et al. | 375/233 |
| 7,197,460 B1 | 3/2007 | Gupta et al. | 704/270.1 |
| 7,203,644 B2 | 4/2007 | Anderson et al. | 704/246 |
| 7,206,418 B2 | 4/2007 | Yang et al. | 381/92 |
| 7,207,011 B2 | 4/2007 | Mulvey et al. | 715/812 |
| 7,228,276 B2 | 6/2007 | Omote et al. | 704/243 |
| 7,231,343 B1 | 6/2007 | Treadgold et al. | 704/9 |
| 7,236,923 B1 | 6/2007 | Gupta | 704/9 |
| 7,272,212 B2 | 9/2007 | Eberle et al. | 379/88.17 |
| 7,277,854 B2 | 10/2007 | Bennett et al. | 704/257 |
| 7,283,829 B2 | 10/2007 | Christenson et al. | 455/461 |
| 7,283,951 B2 | 10/2007 | Marchisio et al. | 704/9 |
| 7,289,606 B2 | 10/2007 | Sibal et al. | 379/52 |
| 7,299,186 B2 | 11/2007 | Kuzunuki et al. | 704/270.1 |
| 7,301,093 B2 | 11/2007 | Sater et al. | 84/615 |
| 7,305,381 B1 | 12/2007 | Poppink et al. | |
| 7,321,850 B2 | 1/2008 | Wakita | 704/10 |
| 7,328,155 B2 | 2/2008 | Endo et al. | 704/251 |
| 7,337,116 B2 | 2/2008 | Charlesworth et al. | 704/254 |
| 7,340,040 B1 | 3/2008 | Saylor et al. | 379/67.1 |
| 7,366,285 B2 | 4/2008 | Parolkar et al. | 379/88.17 |
| 7,366,669 B2 | 4/2008 | Nishitani et al. | 704/256 |
| 7,376,645 B2 | 5/2008 | Bernard | 707/3 |
| 7,386,443 B1 | 6/2008 | Parthasarathy et al. | 704/201 |
| 7,398,209 B2 | 7/2008 | Kennewick et al. | 704/255 |
| 7,406,421 B2 | 7/2008 | Odinak et al. | 704/275 |
| 7,415,414 B2 | 8/2008 | Azara et al. | 704/270 |
| 7,421,393 B1 | 9/2008 | Di Fabbrizio et al. | 704/275 |
| 7,424,431 B2 | 9/2008 | Greene et al. | 704/270 |
| 7,447,635 B1 | 11/2008 | Konopka et al. | 704/275 |
| 7,454,608 B2 | 11/2008 | Gopalakrishnan et al. | 713/100 |
| 7,461,059 B2 | 12/2008 | Richardson et al. | 707/5 |
| 7,472,020 B2 | 12/2008 | Brulle-Drews | 701/211 |
| 7,472,060 B1 | 12/2008 | Gorin et al. | 704/240 |
| 7,478,036 B2 | 1/2009 | Shen et al. | 704/9 |

(56) References Cited

U.S. PATENT DOCUMENTS

| | | |
|---|---|---|
| 7,487,088 B1 | 2/2009 | Gorin et al. ............... 704/240 |
| 7,493,259 B2 | 2/2009 | Jones et al. ................ 704/257 |
| 7,493,559 B1 | 2/2009 | Wolff et al. ................ 715/727 |
| 7,502,738 B2 | 3/2009 | Kennewick et al. ........ 704/257 |
| 7,516,076 B2 | 4/2009 | Walker et al. .............. 704/275 |
| 7,529,675 B2 | 5/2009 | Maes ........................ 704/270.1 |
| 7,536,297 B2 | 5/2009 | Byrd et al. ..................... 704/10 |
| 7,536,374 B2 | 5/2009 | Au ................................ 706/55 |
| 7,542,894 B2 | 6/2009 | Murata ............................ 704/9 |
| 7,546,382 B2 | 6/2009 | Healey et al. .............. 709/246 |
| 7,558,730 B2 | 7/2009 | Davis et al. ................ 704/235 |
| 7,574,362 B2 | 8/2009 | Walker et al. .............. 704/275 |
| 7,577,244 B2 | 8/2009 | Taschereau .............. 379/218.01 |
| 7,606,708 B2 | 10/2009 | Hwang ........................ 704/257 |
| 7,620,549 B2 | 11/2009 | Di Cristo et al. ........... 704/257 |
| 7,634,409 B2 | 12/2009 | Kennewick et al. ........ 704/257 |
| 7,640,006 B2 | 12/2009 | Portman et al. ........... 455/412.1 |
| 7,640,160 B2 | 12/2009 | Di Cristo et al. ........... 704/257 |
| 7,640,272 B2 * | 12/2009 | Mahajan et al. |
| 7,676,365 B2 | 3/2010 | Hwang et al. ............... 704/240 |
| 7,676,369 B2 | 3/2010 | Fujimoto et al. ............ 704/270 |
| 7,684,977 B2 | 3/2010 | Morikawa .................... 704/211 |
| 7,693,720 B2 * | 4/2010 | Kennewick et al. ........ 704/275 |
| 7,729,916 B2 | 6/2010 | Coffman et al. ............ 704/270 |
| 7,729,918 B2 | 6/2010 | Walker et al. .............. 704/275 |
| 7,729,920 B2 | 6/2010 | Chaar et al. ................ 704/275 |
| 7,748,021 B2 | 6/2010 | Obradovich ................. 725/105 |
| 7,788,084 B2 | 8/2010 | Brun et al. ...................... 704/7 |
| 7,801,731 B2 | 9/2010 | Odinak et al. .............. 704/275 |
| 7,809,570 B2 | 10/2010 | Kennewick et al. ........ 704/257 |
| 7,818,176 B2 | 10/2010 | Freeman et al. |
| 7,831,426 B2 | 11/2010 | Bennett ....................... 704/252 |
| 7,831,433 B1 | 11/2010 | Belvin et al. ................ 704/275 |
| 7,873,519 B2 | 1/2011 | Bennett ....................... 704/257 |
| 7,873,523 B2 | 1/2011 | Potter et al. ................ 704/275 |
| 7,881,936 B2 | 2/2011 | Longe et al. ................ 704/257 |
| 7,890,324 B2 | 2/2011 | Bangalore et al. .......... 704/231 |
| 7,894,849 B2 | 2/2011 | Kass et al. ................ 455/550.1 |
| 7,902,969 B2 | 3/2011 | Obradovich ................. 340/439 |
| 7,917,367 B2 | 3/2011 | Di Cristo et al. ......... 704/270.1 |
| 7,920,682 B2 | 4/2011 | Byrne et al. ............... 379/88.18 |
| 7,949,529 B2 | 5/2011 | Weider et al. ............... 704/270 |
| 7,949,537 B2 | 5/2011 | Walker et al. .............. 704/275 |
| 7,953,732 B2 | 5/2011 | Frank et al. ................ 707/724 |
| 7,974,875 B1 | 7/2011 | Quilici et al. .............. 705/14.4 |
| 7,983,917 B2 | 7/2011 | Kennewick et al. ........ 704/257 |
| 7,984,287 B2 | 7/2011 | Gopalakrishnan et al. .. 713/100 |
| 8,005,683 B2 * | 8/2011 | Tessel et al. ................ 704/275 |
| 8,015,006 B2 | 9/2011 | Kennewick et al. ........ 704/236 |
| 8,060,367 B2 | 11/2011 | Keaveney ................... 704/247 |
| 8,069,046 B2 | 11/2011 | Kennewick et al. ........ 704/257 |
| 8,073,681 B2 | 12/2011 | Baldwin et al. ................ 704/9 |
| 8,077,975 B2 | 12/2011 | Ma et al. ..................... 382/187 |
| 8,082,153 B2 | 12/2011 | Coffman et al. ............ 704/270 |
| 8,086,463 B2 | 12/2011 | Ativanichayaphong et al. ............................. 704/275 |
| 8,112,275 B2 | 2/2012 | Kennewick et al. ........ 704/240 |
| 8,140,327 B2 | 3/2012 | Kennewick et al. ........ 704/226 |
| 8,140,335 B2 | 3/2012 | Kennewick et al. ........ 704/257 |
| 8,145,489 B2 | 3/2012 | Freeman et al. ............ 704/257 |
| 8,150,694 B2 | 4/2012 | Kennewick et al. ........ 704/257 |
| 8,155,962 B2 | 4/2012 | Kennewick et al. ........ 704/257 |
| 8,170,867 B2 | 5/2012 | Germain ......................... 704/9 |
| 8,195,468 B2 | 6/2012 | Weider et al. ............... 704/275 |
| 8,200,485 B1 | 6/2012 | Lee ............................. 704/231 |
| 8,219,399 B2 | 7/2012 | Lutz et al. ................... 704/270 |
| 8,219,599 B2 | 7/2012 | Tunstall-Pedoe ........... 707/955 |
| 8,224,652 B2 | 7/2012 | Wang et al. ................. 704/275 |
| 8,255,224 B2 | 8/2012 | Singleton et al. ........... 704/275 |
| 8,326,627 B2 | 12/2012 | Kennewick et al. ........ 704/257 |
| 8,326,634 B2 | 12/2012 | Di Cristo et al. ......... 704/270.1 |
| 8,326,637 B2 | 12/2012 | Baldwin et al. ............. 704/275 |
| 8,332,224 B2 | 12/2012 | Di Cristo et al. ........... 704/257 |
| 8,447,607 B2 | 5/2013 | Weider et al. ............... 704/250 |
| 8,452,598 B2 | 5/2013 | Kennewick et al. ........ 704/257 |
| 8,983,839 B2 | 3/2015 | Kennewick et al. ........ 704/254 |
| 9,015,049 B2 | 4/2015 | Baldwin et al. |
| 2001/0039492 A1 | 11/2001 | Nemoto ....................... 704/231 |
| 2001/0041980 A1 | 11/2001 | Howard et al. ............. 704/270 |
| 2001/0049601 A1 | 12/2001 | Kroeker et al. ............. 704/254 |
| 2001/0054087 A1 | 12/2001 | Flom et al. .................. 709/218 |
| 2002/0015500 A1 | 2/2002 | Belt et al. ...................... 381/66 |
| 2002/0022927 A1 | 2/2002 | Lemelson et al. .......... 701/301 |
| 2002/0029261 A1 * | 3/2002 | Shibata ........................ 709/219 |
| 2002/0032752 A1 * | 3/2002 | Gold et al. .................. 709/218 |
| 2002/0035501 A1 | 3/2002 | Handel et al. ................ 705/10 |
| 2002/0049805 A1 | 4/2002 | Yamada et al. ............. 709/202 |
| 2002/0065568 A1 | 5/2002 | Silfvast et al. ................ 700/94 |
| 2002/0069059 A1 | 6/2002 | Smith .......................... 704/257 |
| 2002/0069071 A1 | 6/2002 | Knockeart et al. .......... 704/275 |
| 2002/0082911 A1 | 6/2002 | Dunn et al. ................... 705/14 |
| 2002/0087326 A1 | 7/2002 | Lee et al. .................. 704/270.1 |
| 2002/0087525 A1 | 7/2002 | Abbott et al. ................... 707/3 |
| 2002/0120609 A1 | 8/2002 | Lang et al. ...................... 707/1 |
| 2002/0124050 A1 | 9/2002 | Middeljans ................. 709/203 |
| 2002/0133402 A1 | 9/2002 | Faber et al. ................... 705/14 |
| 2002/0138248 A1 | 9/2002 | Corston-Oliver et al. ...... 704/1 |
| 2002/0143532 A1 | 10/2002 | McLean et al. ............. 704/235 |
| 2002/0143535 A1 | 10/2002 | Kist et al. .................... 704/251 |
| 2002/0161646 A1 | 10/2002 | Gailey et al. .................. 705/14 |
| 2002/0173961 A1 | 11/2002 | Guerra ........................ 704/258 |
| 2002/0184373 A1 | 12/2002 | Maes .......................... 709/228 |
| 2002/0188602 A1 | 12/2002 | Stubler et al. ................... 707/3 |
| 2002/0198714 A1 | 12/2002 | Zhou ........................... 704/252 |
| 2003/0014261 A1 | 1/2003 | Kageyama .................. 704/275 |
| 2003/0016835 A1 | 1/2003 | Elko et al. ..................... 381/92 |
| 2003/0046346 A1 | 3/2003 | Mumick et al. ............. 709/205 |
| 2003/0064709 A1 | 4/2003 | Gailey et al. ................ 455/412 |
| 2003/0065427 A1 | 4/2003 | Funk et al. ...................... 701/1 |
| 2003/0088421 A1 | 5/2003 | Maes et al. ............... 704/270.1 |
| 2003/0097249 A1 | 5/2003 | Walker et al. .................. 704/1 |
| 2003/0110037 A1 | 6/2003 | Walker et al. ............... 704/257 |
| 2003/0112267 A1 | 6/2003 | Belrose ....................... 345/728 |
| 2003/0115062 A1 | 6/2003 | Walker et al. ............... 704/258 |
| 2003/0120493 A1 | 6/2003 | Gupta ....................... 704/270.1 |
| 2003/0135488 A1 | 7/2003 | Amir et al. ...................... 707/3 |
| 2003/0144846 A1 | 7/2003 | Denenberg et al. ......... 704/277 |
| 2003/0158731 A1 | 8/2003 | Falcon et al. ............... 704/231 |
| 2003/0161448 A1 | 8/2003 | Parolkar et al. ........... 379/88.17 |
| 2003/0182132 A1 | 9/2003 | Niemoeller ................. 704/275 |
| 2003/0204492 A1 | 10/2003 | Wolf et al. ...................... 707/3 |
| 2003/0206640 A1 | 11/2003 | Malvar et al. ................. 381/93 |
| 2003/0212550 A1 | 11/2003 | Ubale .......................... 704/215 |
| 2003/0212558 A1 | 11/2003 | Matula ........................ 704/260 |
| 2003/0212562 A1 | 11/2003 | Patel et al. .................. 704/275 |
| 2003/0225825 A1 | 12/2003 | Healey et al. ............... 709/203 |
| 2003/0236664 A1 | 12/2003 | Sharma ....................... 704/251 |
| 2004/0006475 A1 | 1/2004 | Ehlen et al. ............... 704/270.1 |
| 2004/0025115 A1 | 2/2004 | Sienel et al. ................ 715/513 |
| 2004/0044516 A1 | 3/2004 | Kennewick et al. ............ 704/5 |
| 2004/0098245 A1 | 5/2004 | Walker et al. .................. 704/1 |
| 2004/0117804 A1 | 6/2004 | Scahill et al. ............... 719/320 |
| 2004/0140989 A1 | 7/2004 | Papageorge ................ 345/700 |
| 2004/0158555 A1 * | 8/2004 | Seedman et al. ................ 707/3 |
| 2004/0166832 A1 | 8/2004 | Portman et al. ........... 455/412.1 |
| 2004/0167771 A1 | 8/2004 | Duan et al. .................... 704/10 |
| 2004/0193408 A1 | 9/2004 | Hunt ........................... 704/209 |
| 2004/0193420 A1 * | 9/2004 | Kennewick et al. ........ 704/257 |
| 2004/0199375 A1 | 10/2004 | Ehsani et al. .................... 704/4 |
| 2004/0205671 A1 | 10/2004 | Sukehiro et al. ............ 715/532 |
| 2004/0243417 A9 | 12/2004 | Pitts, III et al. ............. 704/276 |
| 2005/0015256 A1 | 1/2005 | Kargman ..................... 704/272 |
| 2005/0021334 A1 | 1/2005 | Iwahashi ..................... 704/240 |
| 2005/0021470 A1 | 1/2005 | Martin et al. .................. 705/51 |
| 2005/0021826 A1 | 1/2005 | Kumar ......................... 709/232 |
| 2005/0033574 A1 | 2/2005 | Kim et al. ................... 704/251 |
| 2005/0043940 A1 | 2/2005 | Elder .............................. 704/9 |
| 2005/0080632 A1 | 4/2005 | Endo et al. .................. 704/277 |
| 2005/0114116 A1 | 5/2005 | Fiedler ........................ 704/201 |
| 2005/0125232 A1 | 6/2005 | Gadd ........................ 704/270.1 |
| 2005/0137850 A1 | 6/2005 | Odell .............................. 704/4 |
| 2005/0137877 A1 | 6/2005 | Oesterling et al. .......... 704/275 |
| 2005/0143994 A1 | 6/2005 | Mori et al. .................. 704/235 |
| 2005/0216254 A1 | 9/2005 | Gupta et al. .................... 704/9 |

(56) References Cited

U.S. PATENT DOCUMENTS

| | | | |
|---|---|---|---|
| 2005/0234727 A1 | 10/2005 | Chiu | 704/270.1 |
| 2005/0246174 A1 | 11/2005 | DeGolia | 704/270 |
| 2005/0283752 A1 | 12/2005 | Fruchter et al. | 717/100 |
| 2006/0041431 A1 | 2/2006 | Maes | 704/270.1 |
| 2006/0047509 A1 | 3/2006 | Ding et al. | 704/231 |
| 2006/0206310 A1 | 9/2006 | Ravikumar et al. | 704/9 |
| 2006/0217133 A1 | 9/2006 | Christenson et al. | 455/461 |
| 2006/0285662 A1 | 12/2006 | Yin et al. | 379/88.16 |
| 2007/0033005 A1 | 2/2007 | Cristo et al. | 704/9 |
| 2007/0033020 A1 | 2/2007 | (Kelleher) Francois et al. | 704/226 |
| 2007/0038436 A1 | 2/2007 | Cristo et al. | 704/9 |
| 2007/0043574 A1 | 2/2007 | Coffman et al. | 704/275 |
| 2007/0043868 A1 | 2/2007 | Kumar et al. | 709/226 |
| 2007/0050191 A1 | 3/2007 | Weider et al. | 704/275 |
| 2007/0055525 A1 | 3/2007 | Kennewick et al. | 704/257 |
| 2007/0073544 A1 | 3/2007 | Millett et al. | 704/277 |
| 2007/0078708 A1 | 4/2007 | Yu et al. | 705/14 |
| 2007/0078709 A1 | 4/2007 | Rajaram | 705/14 |
| 2007/0118357 A1 | 5/2007 | Kasravi et al. | 704/10 |
| 2007/0135101 A1 | 6/2007 | Ramati et al. | 455/414.1 |
| 2007/0146833 A1* | 6/2007 | Satomi et al. | 358/537 |
| 2007/0162296 A1 | 7/2007 | Altberg et al. | 705/1 |
| 2007/0179778 A1 | 8/2007 | Gong et al. | 704/9 |
| 2007/0186165 A1 | 8/2007 | Maislos et al. | 715/728 |
| 2007/0198267 A1 | 8/2007 | Jones et al. | 704/257 |
| 2007/0214182 A1 | 9/2007 | Rosenberg | 707/104.1 |
| 2007/0250901 A1 | 10/2007 | McIntire et al. | 725/146 |
| 2007/0265850 A1 | 11/2007 | Kennewick et al. | 704/257 |
| 2007/0299824 A1 | 12/2007 | Pan et al. | 707/3 |
| 2008/0034032 A1 | 2/2008 | Healey et al. | 709/203 |
| 2008/0065386 A1 | 3/2008 | Cross et al. | 704/270 |
| 2008/0091406 A1 | 4/2008 | Baldwin et al. | 704/4 |
| 2008/0103761 A1 | 5/2008 | Printz et al. | 704/9 |
| 2008/0109285 A1 | 5/2008 | Reuther et al. | 705/7 |
| 2008/0115163 A1 | 5/2008 | Gilboa et al. | 725/34 |
| 2008/0133215 A1 | 6/2008 | Sarukkai | 704/2 |
| 2008/0140385 A1* | 6/2008 | Mahajan et al. | 704/9 |
| 2008/0147396 A1 | 6/2008 | Wang | 704/246 |
| 2008/0147410 A1 | 6/2008 | Odinak | 704/270.1 |
| 2008/0162471 A1 | 7/2008 | Bernard | 707/5 |
| 2008/0177530 A1 | 7/2008 | Cross et al. | 704/4 |
| 2008/0189110 A1 | 8/2008 | Freeman et al. | 704/251 |
| 2008/0235023 A1 | 9/2008 | Kennewick et al. | 704/257 |
| 2008/0235027 A1 | 9/2008 | Cross | 704/270.1 |
| 2008/0319751 A1 | 12/2008 | Kennewick et al. | 704/257 |
| 2009/0052635 A1 | 2/2009 | Jones et al. | 379/88.02 |
| 2009/0067599 A1 | 3/2009 | Agarwal et al. | 379/114.21 |
| 2009/0076827 A1 | 3/2009 | Bulitta et al. | 704/275 |
| 2009/0106029 A1 | 4/2009 | DeLine et al. | 704/275 |
| 2009/0117885 A1 | 5/2009 | Roth | 455/414.3 |
| 2009/0144271 A1 | 6/2009 | Richardson et al. | 707/5 |
| 2009/0150156 A1 | 6/2009 | Kennewick et al. | 704/257 |
| 2009/0171664 A1 | 7/2009 | Kennewick et al. | 704/257 |
| 2009/0216540 A1* | 8/2009 | Tessel et al. | 704/275 |
| 2009/0271194 A1 | 10/2009 | Davis et al. | 704/235 |
| 2009/0273563 A1 | 11/2009 | Pryor | 345/157 |
| 2009/0276700 A1* | 11/2009 | Anderson et al. | 715/700 |
| 2009/0299745 A1 | 12/2009 | Kennewick et al. | 704/257 |
| 2009/0313026 A1 | 12/2009 | Coffman et al. | 704/275 |
| 2010/0023320 A1 | 1/2010 | Di Cristo et al. | 704/9 |
| 2010/0029261 A1 | 2/2010 | Mikkelsen et al. | 455/419 |
| 2010/0036967 A1* | 2/2010 | Caine et al. | 709/236 |
| 2010/0049501 A1 | 2/2010 | Kennewick et al. | 704/9 |
| 2010/0049514 A1 | 2/2010 | Kennewick et al. | 704/233 |
| 2010/0057443 A1 | 3/2010 | Di Cristo et al. | 704/9 |
| 2010/0063880 A1 | 3/2010 | Atsmon et al. | 705/14.53 |
| 2010/0094707 A1 | 4/2010 | Freer | 705/14.54 |
| 2010/0145700 A1 | 6/2010 | Kennewick et al. | 704/257 |
| 2010/0185512 A1 | 7/2010 | Borger et al. | 705/14.49 |
| 2010/0204986 A1 | 8/2010 | Kennewick et al. | 704/226 |
| 2010/0204994 A1 | 8/2010 | Kennewick et al. | 704/257 |
| 2010/0217604 A1 | 8/2010 | Baldwin et al. | 704/275 |
| 2010/0286985 A1 | 11/2010 | Kennewick et al. | 704/257 |
| 2010/0299142 A1 | 11/2010 | Freeman et al. | 704/9 |
| 2010/0312566 A1 | 12/2010 | Odinak et al. | 704/275 |
| 2011/0022393 A1 | 1/2011 | Waller et al. | 704/270 |
| 2011/0112827 A1 | 5/2011 | Kennewick et al. | 704/9 |
| 2011/0131036 A1 | 6/2011 | Di Cristo et al. | 704/9 |
| 2011/0131045 A1 | 6/2011 | Cristo et al. | 704/249 |
| 2011/0231182 A1 | 9/2011 | Weider et al. | 704/9 |
| 2011/0231188 A1 | 9/2011 | Kennewick et al. | 704/236 |
| 2012/0022857 A1 | 1/2012 | Baldwin et al. | 704/9 |
| 2012/0101809 A1 | 4/2012 | Kennewick et al. | 704/9 |
| 2012/0101810 A1 | 4/2012 | Kennewick et al. | 704/9 |
| 2012/0109753 A1 | 5/2012 | Kennewick et al. | 705/14.58 |
| 2012/0150636 A1 | 6/2012 | Freeman et al. | 705/14.49 |
| 2012/0278073 A1 | 11/2012 | Weider et al. | 704/235 |
| 2015/0066627 A1 | 3/2015 | Freeman et al. | 705/14.41 |
| 2015/0073910 A1 | 3/2015 | Kennewick et al. | 705/14.58 |
| 2015/0095159 A1 | 4/2015 | Kennewick et al. | 705/14.58 |

FOREIGN PATENT DOCUMENTS

| | | |
|---|---|---|
| WO | WO 99/46763 | 9/1999 |
| WO | WO 00/21232 | 4/2000 |
| WO | WO 00/46792 | 8/2000 |
| WO | WO 01/78065 | 10/2001 |
| WO | WO 2004/072954 | 8/2004 |
| WO | WO 2007/019318 | 2/2007 |
| WO | WO 2007/021587 | 2/2007 |
| WO | WO 2007/027546 | 3/2007 |
| WO | WO 2007/027989 | 3/2007 |
| WO | WO 2008/098039 | 8/2008 |
| WO | WO 2008/118195 | 10/2008 |
| WO | WO 2009/075912 | 6/2009 |
| WO | WO 2009/145796 | 12/2009 |
| WO | WO 2010/096752 | 8/2010 |

OTHER PUBLICATIONS

Lin, Bor-shen, et al., "A Distributed Architecture for Cooperative Spoken Dialogue Agents with Coherent Dialogue State and History", ASRU'99, 1999, 4 pages.

Kuhn, Thomas, et al., "Hybrid In-Car Speech Recognition for Mobile Multimedia Applications", Vehicular Technology Conference, IEEE, Jul. 1999, pp. 2009-2013.

Belvin, Robert, et al., "Development of the HRL Route Navigation Dialogue System", Proceedings of the First International Conference on Human Language Technology Research, San Diego, 2001, pp. 1-5.

Lind, R., et al., "The Network Vehicle—A Glimpse into the Future of Mobile Multi-Media" *IEEE Aerosp. Electron. Systems Magazine*, vol. 14, No. 9, Sep. 1999, pp. 27-32.

Zhao, Yilin, "Telematics: Safe and Fun Driving", *IEEE Intelligent Systems*, vol. 17, Issue 1, 2002, pp. 10-14.

Chai et al., "MIND: A Semantics-Based Multimodal Interpretation Framework for Conversational System", *Proceedings of the International CLASS Workshop on Natural, Intelligent and Effective Interaction in Multimodal Dialogue Systems*, Jun. 2002, pp. 37-46.

Cheyer et al., "Multimodal Maps: An Agent-Based Approach", *International Conference on Cooperative Multimodal Communication* (CMC/95), May 24-26, 1995, pp. 111-121.

Elio et al., "On Abstract Task Models and Conversation Policies" in Workshop on Specifying and Implementing Conversation Policies, *Autonomous Agents '99*, Seattle, 1999, 10 pages.

Turunen, "Adaptive Interaction Methods in Speech User Interfaces", Conference on Human Factors in Computing Systems, Seattle, Washington, 2001, pp. 91-92.

Mao, Mark Z., "Automatic Training Set Segmentation for Multi-Pass Speech Recognition", Department of Electrical Engineering, Stanford University, CA, copyright 2005, IEEE, pp. I-685 to I-688.

Vanhoucke, Vincent, "Confidence Scoring and Rejection Using Multi-Pass Speech Recognition", Nuance Communications, Menlo Park, CA, 2005, 4 pages.

Weng, Fuliang, et al., "Efficient Lattice Representation and Generation", Speech Technology and Research Laboratory, SRI International, Menlo Park, CA, 1998, 4 pages.

(56) References Cited

OTHER PUBLICATIONS

El Meliani et al., "A Syllabic-Filler-Based Continuous Speech Recognizer for Unlimited Vocabulary", Canadian Conference on Electrical and Computer Engineering, vol. 2, Sep. 5-8, 1995, pp. 1007-1010.
Arrington, Michael, "Google Redefines GPS Navigation Landscape: Google Maps Navigation for Android 2.0", TechCrunch, printed from the Internet <http://www.techcrunch.com/2009/10/28/google-redefines-car-gps-navigation-google-maps-navigation-android/>, Oct. 28, 2009, 4 pages.
Bazzi, Issam et al., "Heterogeneous Lexical Units for Automatic Speech Recognition: Preliminary Investigations", *Processing of the IEEE International Conference on Acoustics, Speech, and Signal Processing*, vol. 3, Jun. 5-9, 2000, XP010507574, pp. 1257-1260.
O'Shaughnessy, Douglas, "Interacting with Computers by Voice: Automatic Speech Recognition and Synthesis", *Proceedings of the IEEE*, vol. 91, No. 9, Sep. 1, 2003, XP011100665, pp. 1272-1305.
Statement in Accordance with the Notice from the European Patent Office dated Oct. 1, 2007 Concerning Business Methods (OJ EPO Nov. 2007, 592-593), XP002456252.

\* cited by examiner

SYSTEM AND METHOD FOR PROVIDING A NATURAL LANGUAGE CONTENT DEDICATION SERVICE

CROSS-REFERENCE TO RELATED APPLICATIONS

This application claims the benefit of U.S. Provisional Patent Application Ser. No. 61/259,820, entitled "System and Method for Providing a Natural Language Content Dedication Service," filed Nov. 10, 2009, the contents of which are hereby incorporated by reference in their entirety.

FIELD OF THE INVENTION

The invention generally relates to providing a natural language content dedication service in a voice services environment, and in particular, to detecting multi-modal device interactions that include requests to dedicate content, identifying the content requested for dedication from natural language utterances included in the multi-modal device interactions, processing transactions for the content requested for dedication, processing natural language to customize the content for recipients of the dedications, and delivering the customized content to the recipients of the dedications.

BACKGROUND OF THE INVENTION

As technology has progressed in recent years, consumer electronic devices have emerged to become nearly ubiquitous in the everyday lives of many people. To meet the increasing demand that has resulted from growth in the functionality and mobility of mobile phones, navigation devices, embedded devices, and other such devices, many devices offer a wealth of features and functions in addition to core applications. Greater functionality also introduces trade-offs, however, including learning curves that often inhibit users from fully exploiting all of the capabilities of their electronic devices. For example, many existing electronic devices include complex human to machine interfaces that may not be particularly user-friendly, which can inhibit mass-market adoption for many technologies. Moreover, cumbersome interfaces often result in otherwise desirable features being difficult to find or use (e.g., because of menus that are complex or otherwise tedious to navigate). As such, many users tend not to use, or even know about, many of the potential capabilities of their devices.

As such, the increased functionality of electronic devices often tends to be wasted, as market research suggests that many users only use only a fraction of the features or applications available on a given device. Moreover, in a society where wireless networking and broadband access are increasingly prevalent, consumers tend to naturally desire seamless mobile capabilities from their electronic devices. Thus, as consumer demand intensifies for simpler mechanisms to interact with electronic devices, cumbersome interfaces that prevent quick and focused interaction become an important concern. Nevertheless, the ever-growing demand for mechanisms to use technology in intuitive ways remains largely unfulfilled.

One approach towards simplifying human to machine interactions in electronic devices has included the use of voice recognition software, which has the potential to enable users to exploit features that would otherwise be unfamiliar, unknown, or difficult to use. For example, a recent survey conducted by the Navteq Corporation, which provides data used in a variety of applications such as automotive navigation and web-based applications, demonstrates that voice recognition often ranks among the features most desired by consumers of electronic devices. Even so, existing voice user interfaces, when they actually work, still require significant learning on the part of the user.

For example, many existing voice user interface only support requests formulated according to specific command-and-control sequences or syntaxes. Furthermore, many existing voice user interfaces cause user frustration or dissatisfaction because of inaccurate speech recognition. Similarly, by forcing a user to provide pre-established commands or keywords to communicate requests in ways that a system can understand, existing voice user interfaces do not effectively engage the user in a productive, cooperative dialogue to resolve requests and advance a conversation towards a satisfactory goal (e.g., when users may be uncertain of particular needs, available information, device capabilities, etc.). As such, existing voice user interfaces tend to suffer from various drawbacks, including significant limitations on engaging users in a dialogue in a cooperative and conversational manner.

Additionally, many existing voice user interfaces fall short in utilizing information distributed across different domains, devices, and applications in order to resolve natural language voice-based inputs. Thus, existing voice user interfaces suffer from being constrained to a finite set of applications for which they have been designed, or to devices on which they reside. Although technological advancement has resulted in users often having several devices to suit their various needs, existing voice user interfaces do not adequately free users from device constraints. For example, users may be interested in services associated with different applications and devices, but existing voice user interfaces tend to restrict users from accessing the applications and devices as they see fit. Moreover, users typically can only practicably carry a finite number of devices at any given time, yet content or services associated with users' devices other than those currently being used may be desired in various circumstances.

Accordingly, although users tend to have varying needs, where content or services associated with different devices may be desired in various contexts or environments, existing voice technologies tend to fall short in providing an integrated environment in which users can request content or services associated with virtually any device or network. As such, constraints on information availability and device interaction mechanisms in existing voice services environments tend to prevent users from experiencing technology in an intuitive, natural, and efficient way. For instance, when a user wishes to perform a given function using a given electronic device, but does not necessarily know how to go about performing the function, the user typically cannot engage in cooperative multi-modal interactions with the device to simply utter words in natural language to request the function.

Furthermore, relatively simple functions can often be tedious to perform using electronic devices that do not have voice recognition capabilities. For example, purchasing new ring-tones for a mobile phone tends to be a relatively straightforward process, but users must typically navigate several menus and press many different buttons in order to complete the process. In another example, users often listen to music or interact with other media in mobile environments, such that interest in purchasing music, media, or other content may be fleeting or often occur on an impulse basis. Whereas existing human to machine interfaces that lack voice recognition capabilities typically fall short in providing mechanisms that can readily meet this demand, adding voice recognition to an electronic device can substantially simplify human to machine interaction in a manner that can meet user needs, improve experience, and satisfy potentially transient consumer interests. As such, interaction with electronic devices could be made far more efficient if users were provided with the ability to use natural language in order to exploit buried or otherwise difficult to use functionality.

SUMMARY OF THE INVENTION

According to one aspect of the invention, a system and method for providing a natural language content dedication service may generally operate in a voice services environment that includes one or more electronic devices that can receive multi-modal natural language device interactions. In particular, providing the natural language content dedication service may generally include detecting multi-modal device interactions that include requests to dedicate content, identifying the content requested for dedication from natural language utterances included in the multi-modal device interactions, processing transactions for the content requested for dedication, processing natural language to customize the content for recipients of the dedications, and delivering the customized content to the recipients of the dedications.

According to one aspect of the invention, the natural language content dedication service may operate in a hybrid processing environment, which may generally include a plurality of multi-modal devices configured to cooperatively interpret and process natural language utterances included in the multi-modal device interactions. For example, a virtual router may receive messages that include encoded audio corresponding to natural language utterances contained in the multi-modal device interactions, which may be received at one or more of the plurality of multi-modal devices in the hybrid processing environment. For example, the virtual router may analyze the encoded audio to select a cleanest sample of the natural language utterances and communicate with one or more other devices in the hybrid processing environment to determine an intent of the multi-modal device interactions. The virtual router may then coordinate resolving the multi-modal device interactions based on the intent of the multi-modal device interactions.

According to one aspect of the invention, a method for providing the natural language content dedication service may comprise detecting a multi-modal device interaction at an electronic device, wherein the multi-modal device interaction may include at least a natural language utterance. One or more messages containing information relating to the multi-modal device interaction may then be communicated to the virtual router through a messaging interface. The electronic device may then receive one or more messages (e.g., from the virtual router through message interface), wherein the messages may contain information relating to an intent of the multi-modal device interaction. As such, the multi-modal device interaction may be resolved at the electronic device based on the information contained in the one or more messages received from the virtual router.

According to one aspect of the invention, a system for providing the natural language content dedication service may generally include a voice-enabled client device that can communicate with a content dedication system through the messaging interface. The content dedication system include a voice-enabled server, which may be configured to communicate with the virtual router through another messaging interface, or the content dedication system may alternatively include the virtual router. In addition, the content dedication system may further include a billing system for processing transactions relating to the content dedication service. The natural language content dedication service may be provided on any suitable voice-enabled client device having a suitable combination of input and output devices that can receive and respond to multi-modal device interactions that include natural language utterances, and the input and output devices may be further arranged to receive and respond to any other suitable type of input and output.

According to one aspect of the invention, operating the natural language content dedication service may generally include a user of the voice-enabled client device listening to music, watching video, or otherwise interacting with content and providing a multi-modal natural language request to engage in a transaction to dedicate the music, video, or other content. Furthermore, the voice-enabled client device may be included within the hybrid processing environment that includes the plurality of multi-modal devices, whereby the content dedication request may relate to content played on a different device from the voice-enabled client device, although the content dedication request may relate to any suitable content (i.e., the request need not necessarily relate to played content, as users may provide natural language to request content dedications for any suitable content, including a particular song or video that the user may be thinking about).

According to one aspect of the invention, in response to the voice-enabled client device receiving a multi-modal interaction that includes a natural language utterance, the voice-enabled client device may invoke an Automatic Speech Recognizer (ASR) to generate a preliminary interpretation of the utterance. The ASR may then provide the preliminary interpretation of the utterance to a conversational language processor, which may attempt to determine an intent for the multi-modal interaction. For example, to determine the intent for the multi-modal interaction, the conversational language processor may determine a most likely context for the interaction from the preliminary interpretation of the utterance, any accompanying non-speech inputs in the multi-modal interaction that relate to the utterance, contexts associated with prior requests, short-term and long-term shared knowledge, or any other suitable information for interpreting the multi-modal interaction. Thus, in response to the conversational language processor determining that the intent for the multi-modal interaction relates to a content dedication request, a content dedication application may be invoked to resolve the content dedication request.

According to one aspect of the invention, to resolve the intent of the content dedication request, the conversational language processor may search one or more data repositories that contain content information to identify content matching criteria contained in the content dedication request. Moreover, the conversational language processor may further cooperate with other devices in the hybrid processing environment to search for or otherwise identify the content requested for dedication (e.g., in response to a local data repository not yielding adequate results, another device in the hybrid processing environment having a larger content data repository than the client device may be invoked.). The conversational language processor may then receive appropriate results identifying the content requested for dedication and present the results to the user through the output device (e.g., displaying information about the content, playing a sample clip of the content, displaying options to purchase the content, recommending similar content, etc.). The results presented through the output device may further include an option to confirm the content dedication, wherein the user may confirm the content dedication in a natural language utterance, a non-speech input, or any suitable combination thereof. The content dedication application may then be invoked to process the content dedication request.

According to one aspect of the invention, to process the content dedication request, the content dedication application may capture a natural language utterance that contains the dedication to accompany the content. The user may then provide the dedication utterance through the voice-enabled input device, and the dedication utterance may then be converted into an electronic signal that the content dedication application captures for the dedication. In addition, the content dedication application may prompt the user to provide any additional tags for the dedicated content (e.g., an image to insert as album art in the dedicated content, an utterance to insert or transcribe into metadata tags for the dedicated content, a non-speech or data input to insert in the metadata tags for the dedicated content, etc.). The content dedication application may further prompt the user to identify a recipient of the dedication, wherein the user may provide any suitable multi-modal input that includes information identifying the recipient of the content dedication. The content dedication application may then route the request to the content dedication system, which may process a transaction for the content dedication.

According to one aspect of the invention, processing the transaction for the content dedication may include the content dedication system receiving encoded audio corresponding to the dedication utterance through the messaging interface. The content dedication system may then insert the encoded audio corresponding to the dedication utterance within the dedicated content, verbally annotate the dedicated content with the encoded audio, and/or transcribe the dedication utterance into a textual annotation for the dedicated content. Similarly, any utterances to insert into the metadata tags for the dedicated content may provide further verbal annotations for the dedicated content, and any such utterances may also be transcribed into text to provide further textual annotations for the dedicated content. The content dedication system may then invoke a content dedication application hosted on the voice-enabled server to process the request. In particular, the content dedication application hosted on the voice-enabled server may identify the content requested for dedication (e.g., if the content dedication application on the voice-enabled client device was unable to suitably identify the requested content, or the information communicated from the voice-enabled client device may identify the requested content if the content dedication application on the voice-enabled client device was able to suitably identify the requested content, etc.). In response to identifying the content to be dedicated, the content dedication system may then communicate with the billing system to process an appropriate transaction for the dedication request based on a selected purchase option for the dedication request.

According to one aspect of the invention, the content dedication system may support various purchase options to provide users with flexibility in requesting content dedications. For example, a buy-to-own purchase option may include the content dedication system purchasing full rights to the content from an appropriate content provider. The billing system may then charge the user of the voice-enabled client device an appropriate amount that encompasses the cost for purchasing the rights to the content from the content provider and a service charge for customizing the content with the dedication and any additional tags and subsequently delivering the customized content to the dedication recipient. The user may be charged in a similar manner under a pay-to-play purchase option, except that the rights purchased from the content provider may be limited (e.g., to a predetermined number of plays). Thus, the cost for purchasing the content from the content provider may be somewhat less under the pay-to-play purchase option, such that the billing system may charge the user somewhat less under the pay-to-play purchase option. Under a paid subscription purchase option, the user may pay a periodic service charge to the content dedication system that permits the user to make content dedications based on terms of the subscription (e.g., a predetermined number an unlimited number of content dedications may be made in a subscription period depending on the particular terms of the user's subscription). Furthermore, other purchase options may be suitably employed, as will be apparent.

According to one aspect of the invention, a service provider associated with the content dedication system may negotiate agreements with content providers to determine the manner in which revenues for content transactions will be shared between the content dedication system and the content providers. For example, an agreement may permit a particular content provider to keep all of the revenue for transactions that include purchasing content from the content provider, while the service provider associated with the content dedication system agrees to recoup any such costs from users. In another example, an agreement may share revenue for content transactions between a content provider and the service provider. Thus, the agreements may generally include any suitable arrangements that define the manner in which content providers and the service provider agree to divide revenue for transactions in, which the content dedication system purchases content from the content provider, while the service provider associated with the content dedication system may be responsible for billing users for any natural language aspects of the content dedication service (e.g., for inserting dedication utterances, transcribing utterances into metadata tags, delivering the content to recipients, etc.).

According to one aspect of the invention, in response to purchasing the requested content from an appropriate service provider and determining the appropriate billing options for the content dedication, the content dedication system may insert the natural language dedication utterance into the dedicated content, verbally annotate the dedicated content with the dedication utterance, or otherwise associate the content with the dedication utterance. Furthermore, the content dedication system may determine whether any additional tags have been specified for the dedicated content and insert such additional tags into the dedicated content, as appropriate (e.g., inserting an image or picture into metadata tags corresponding to album art for the dedicated content, transcribing natural language utterances, non-voice, and/or data inputs into text and inserting such text into the metadata tags for the dedicated content, etc.). The content dedication system may then send a content dedication message to the recipient of the dedication, wherein the message may include a link that the recipient can select to stream, download, or otherwise access the dedicated content, the dedication utterance, etc.). Thus, the content dedication message may generally notify the recipient that content has been dedicated to the recipient and provide various mechanisms for the recipient to access the content dedication, as will be apparent. Furthermore, if the purchase option selected for the content dedication includes the buy-to-own purchase option or another purchase option that confers full rights to the dedicated content, the recipient may then own the full rights to the dedicated content, otherwise the recipient may own rights with respect to the dedicated content based on whatever terms the selected purchase option provides.

Other objects and advantages of the invention will be apparent based on the following drawings and detailed description.

DETAILED DESCRIPTION

Figure 1:
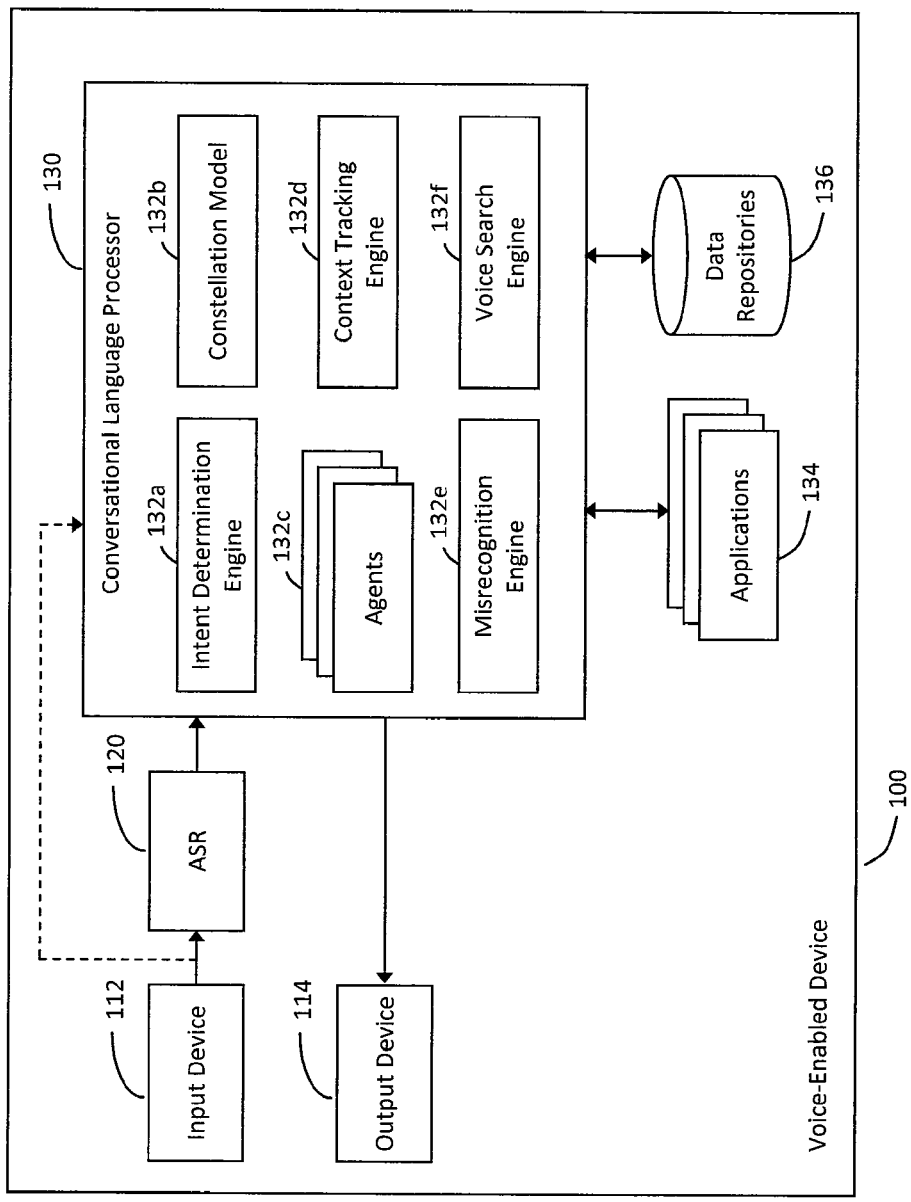
FIG. 1 illustrates a block diagram of an exemplary voice-enabled device that can be used for hybrid processing in a natural language voice services environment, according to one aspect of the invention.

According to one aspect of the invention, FIG. 1 illustrates a block diagram of an exemplary voice-enabled device 100 that can be used for hybrid processing in a natural language voice services environment. As will be apparent from the further description to be provided herein, the voice-enabled device 100 illustrated in FIG. 1 may generally include an input device 112, or a combination of input devices 112, which may enable a user to interact with the voice-enabled device 100 in a multi-modal manner. In particular, the input devices 112 may generally include any suitable combination of at least one voice input device 112 (e.g., a microphone) and at least one non-voice input device 112 (e.g., a mouse, touch-screen display, wheel selector, etc.). As such, the input devices 112 may include any suitable combination of electronic devices having mechanisms for receiving both voice-based and non-voice-based inputs (e.g., a microphone coupled to one or more of a telematics device, personal navigation device, mobile phone, VoIP node, personal computer, media device, embedded device, server, or other electronic device).

In one implementation, the voice-enabled device 100 may enable the user to engage in various multi-modal conversational interactions, which the voice-enabled device 100 may process in a free-form and cooperative manner to execute various tasks, resolve various queries, or otherwise resolve various natural language requests included in the multi-modal interactions. For example, in one implementation, the voice-enabled device 100 may include various natural language processing components, including at least a voice-click module coupled to the one or more input devices 112, as described in further detail in co-pending U.S. patent application Ser. No. 12/389,678, entitled "System and Method for Processing Multi-Modal Device Interactions in a Natural Language Voice Services Environment," filed Feb. 20, 2009, the contents of which are hereby incorporated by reference in their entirety. Thus, as will be described in further detail herein, the one or more input devices 112 and the voice-click module may be collectively configured to process various multi-modal interactions between the user and the voice-enabled device 100.

For example, in one implementation, the multi-modal interactions may include at least one natural language utterance, wherein the natural language utterance may be converted into an electronic signal. The electronic signal may then be provided to an Automatic Speech Recognizer (ASR) 120, which may also be referred to as a speech recognition engine 120 and/or a multi-pass speech recognition engine 120. In response to receiving the electronic signal corresponding to the utterance, the ASR 120 may generate one or more preliminary interpretations of the utterance and provide the preliminary interpretation to a conversational language processor 130. Additionally, in one implementation, the multi-modal interactions may include one or more non-voice interactions with the one or more input devices 112 (e.g., button pushes, multi-touch gestures, point of focus or attention focus selections, etc.). As such, the voice-click module may extract context from the non-voice interactions and provide the context to the conversational language processor 130 for use in generating an interpretation of the utterance (i.e., via the dashed line illustrated in FIG. 1). As such, as described in greater detail below, the conversational language processor 130 may analyze the utterance and any accompanying non-voice interactions to determine an intent of the multi-modal interactions with the voice-enabled device 100.

In one implementation, as noted above, the voice-enabled device 100 may include various natural language processing components that can support free-form utterances and/or other forms of non-voice device interactions, which may liberate the user from restrictions relating to the manner of formulating commands, queries, or other requests. As such, the user may provide the utterance to the voice input device 112 using any manner of speaking, and may further provide other non-voice interactions to the non-voice input device 112 to request any content or service available through the voice-enabled device 100. For instance, in one implementation, in response to receiving the utterance at the voice input device 112, the utterance may be processed using techniques described in U.S. patent application Ser. No. 10/452,147, entitled "Systems and Methods for Responding to Natural Language Speech Utterance," which issued as U.S. Pat. No. 7,398,209 on Jul. 8, 2008, and co-pending U.S. patent application Ser. No. 10/618,633, entitled "Mobile Systems and Methods for Responding to Natural Language Speech Utterance," filed Jun. 15, 2003, the contents of which are hereby incorporated by reference in their entirety. In addition, the user may interact with one or more of the non-voice input devices 112 to provide buttons pushes, multi-touch gestures, point of focus or attention focus selections, or other non-voice device interactions, which may provide further context or other information relating to the natural language utterances and/or the requested content or service.

In one implementation, the voice-enabled device 100 may be coupled to one or more additional systems that may be configured to cooperate with the voice-enabled device 100 to interpret or otherwise process the multi-modal interactions that include combinations of natural language utterances and/or non-voice device interactions. For example, as will be described in greater detail below in connection with FIG. 2, the one or more additional systems may include one or more multi-modal voice-enabled devices having similar natural language processing capabilities to the voice-enabled device 100, one or more non-voice devices having data retrieval and/or task execution capabilities, and a virtual router that coordinates interaction among the voice-enabled device 100 and the additional systems. As such, the voice-enabled device 100 may include an interface to an integrated natural language voice services environment that includes a plurality of multi-modal devices, wherein the user may request content or services available through any of the multi-modal devices.

For example, in one implementation, the conversational language processor 130 may include a constellation model 132b that provides knowledge relating to content, services, applications, intent determination capabilities, and other features available in the voice services environment, as described in co-pending U.S. patent application Ser. No. 12/127,343, entitled "System and Method for an Integrated, Multi-Modal, Multi-Device Natural Language Voice Services Environment," filed May 27, 2008, the contents of which are hereby incorporated by reference in their entirety. As such, the voice-enabled device 100 may have access to shared knowledge relating to natural language processing capabilities, context, prior interactions, domain knowledge, short-term knowledge, long-term knowledge, and cognitive models for the various systems and multi-modal devices, providing a cooperative environment for resolving the multi-modal interactions received at the voice-enabled device 100.

In one implementation, the input devices 112 and the voice-click module coupled thereto may be configured to continually monitor for one or more multi-modal interactions received at the voice-enabled device 100. In particular, the input devices 112 and the voice-click module may continually monitor for one or more natural language utterances and/or one or more distinguishable non-voice device interactions, which may collectively provide the relevant context for retrieving content, executing tasks, invoking services or commands, or processing any other suitable requests. Thus, in response to detecting one or more multi-modal interactions, the input devices 112 and/or the voice-click module may signal the voice-enabled device 100 that an utterance and/or a non-voice interaction have been received. For example, in one implementation, the non-voice interaction may provide context for sharpening recognition, interpretation, and understanding of an accompanying utterance, and moreover, the utterance may provide further context for enhancing interpretation of the accompanying non-voice interaction. Accordingly, the utterance and the non-voice interaction may collectively provide relevant context that various natural language processing components may use to determine an intent of the multi-modal interaction that includes the utterance and the non-voice interaction.

In one implementation, as noted above, processing the utterance included in the multi-modal interaction may be initiated at the ASR 120, wherein the ASR 120 may generate one or more preliminary interpretations of the utterance. In one implementation, to generate the preliminary interpretations of the utterance, the ASR 120 may be configured to recognize one or more syllables, words, phrases, or other acoustic characteristics from the utterance using one or more dynamic recognition grammars and/or acoustic models. For example, in one implementation, the ASR 120 may use the dynamic recognition grammars and/or the acoustic models to recognize a stream of phonemes from the utterance based on phonetic dictation techniques, as described in U.S. patent application Ser. No. 11/513,269, entitled "Dynamic Speech Sharpening," which issued as U.S. Pat. No. 7,634,409 on Dec. 15, 2009, the contents of which are hereby incorporated by reference in their entirety. In addition, the dynamic recognition grammars and/or the acoustic models may include unstressed central vowels (e.g., "schwa"), which may reduce a search space for recognizing the stream of phonemes for the utterance.

Furthermore, in one implementation, the ASR 120 may be configured as a multi-pass speech recognition engine 120, as described in U.S. patent application Ser. No. 11/197,504, entitled "Systems and Methods for Responding to Natural Language Speech Utterance," which issued as U.S. Pat. No. 7,640,160 on Dec. 29, 2009, the contents of which are hereby incorporated by reference in their entirety. The multi-pass speech recognition 120 may be configured to initially invoke a primary speech recognition engine to generate a first transcription of the utterance, and further to optionally subsequently invoke one or more secondary speech recognition engines to generate one or more secondary transcriptions of the utterance. In one implementation, the first transcription may be generated using a large list dictation grammar, while the secondary transcriptions may be generated using virtual dictation grammars having decoy words for out-of-vocabulary words, reduced vocabularies derived from a conversation history, or other dynamic recognition grammars. For example, in one implementation, if a confidence level for the first transcription does not meet or exceed a threshold, the secondary speech recognition engines may be invoked to sharpen the interpretation of the primary speech recognition engine. It will be apparent, however, that the multi-pass speech recognition engine 120 may interpret the utterance using any suitable combination of techniques that results in a preliminary interpretation derived from a plurality of transcription passes for the utterance (e.g., the secondary speech recognition engines may be invoked regardless of the confidence level for the first transcription, or the primary speech recognition engine and/or the secondary speech recognition engines may employ recognition grammars that are identical or optimized for a particular interpretation context, etc.).

Accordingly, in one implementation, the dynamic recognition grammars used in the ASR 120 may be optimized for different languages, contexts, domains, memory constraints, and/or other suitable criteria. For example, in one implementation, the voice-enabled device 100 may include one or more applications 134 that provide content or services for a particular context or domain, such as a navigation application 134. As such, in response to the ASR 120 determining navigation as the most likely context for the utterance, the dynamic recognition grammars may be optimized for various physical, temporal, directional, or other geographical characteristics (e.g., as described in co-pending U.S. patent application Ser. No. 11/954,064, entitled "System and Method for Providing a Natural Language Voice User Interface in an Integrated Voice Navigation Services Environment," filed Dec. 11, 2007, the contents of which are hereby incorporated by reference in their entirety). In another example, an utterance containing the word "traffic" may be subject to different interpretations depending on whether the user intended a navigation context (i.e., traffic on roads), a music context (i.e., the 1960's rock band), or a movie context (i.e., the Steven Soderbergh film). Accordingly, the recognition grammars used in the ASR 120 may be dynamically adapted to optimize accurate recognition for any given utterance (e.g., in response to incorrectly interpreting an utterance to contain a particular word or phrase, the incorrect interpretation may be removed from the recognition grammar to prevent repeating the incorrect interpretation).

In one implementation, in response to the ASR 120 generating the preliminary interpretations of the utterance included in the multi-modal interaction using one or more of the techniques described above, the ASR 120 may provide the preliminary interpretations to the conversational language processor 130. The conversational language processor 130 may generally include various natural language processing components, which may be configured to model human-to-human conversations or interactions. Thus, the conversational language processor 130 may invoke one or more of the natural language processing components to further analyze the preliminary interpretations of the utterance and any accompanying non-voice interactions to determine the intent of the multi-modal interactions received at the voice-enabled device 100.

In one implementation, the conversational language processor 120 may invoke an intent determination engine 130a configured to determine the intent of the multi-modal interactions received at the voice-enabled device 100. In one implementation, the intent determination engine 130a may invoke a knowledge-enhanced speech recognition engine that provides long-term and short-term semantic knowledge for determining the intent, as described in co-pending U.S. patent application Ser. No. 11/212,693, entitled "Mobile Systems and Methods of Supporting Natural Language Human-Machine Interactions," filed Aug. 29, 2005, the contents of which are hereby incorporated by reference in their entirety. For example, in one implementation, the semantic knowledge may be based on a personalized cognitive model derived from one or more prior interactions with the user, a general cognitive model derived from one or more prior interactions with various different users, and/or an environmental cognitive model derived from an environment associated with the user, the voice-enabled device 100, and/or the voice services environment (e.g., ambient noise characteristics, location sensitive information, etc.).

Furthermore, the intent determination engine 132a may invoke a context tracking engine 132d to determine the context for the multi-modal interactions. For example, any context derived from the natural language utterance and/or the non-voice interactions in the multi-modal interactions may be pushed to a context stack associated with the context tracking engine 132d, wherein the context stack may include various entries that may be weighted or otherwise ranked according to one or more contexts identified from the cognitive models and the context for the current multi-modal interactions. As such, the context tracking engine 132d may determine one or more entries in the context stack that match information associated with the current multi-modal interactions to determine a most likely context for the current multi-modal interactions. The context tracking engine 132d may then provide the most likely context to the intent determination engine 132a, which may determine the intent of the multi-modal interactions in view of the most likely context.

In addition, based on the most likely context, the intent determination engine 132a may reference the constellation model 132b to determine whether to invoke any of the various systems or multi-modal devices in the voice services environment. For example, as noted above, the constellation model 132b may provide intent determination capabilities, domain knowledge, semantic knowledge, cognitive models, and other information available through the various systems and multi-modal devices. As such, the intent determination engine 132a may reference the constellation model 132b to determine whether one or more of the other systems and/or multi-modal devices should be engaged to participate in determining the intent of the multi-modal interactions. For example, in response to the constellation model 132b indicating that one or more of the other systems and/or multi-modal devices have natural language processing capabilities optimized for the most likely context, the intent determination engine 132a may forward information relating to the multi-modal interactions to such systems and/or multi-modal devices, which may then determine the intent of the multi-modal interactions and return the intent determination to the voice-enabled device 100.

In one implementation, the conversational language processor 130 may be configured to engage the user in one or more cooperative conversations to resolve the intent or otherwise process the multi-modal interactions, as described in co-pending U.S. patent application Ser. No. 11/580,926, entitled "System and Method for a Cooperative Conversational Voice User Interface," filed Oct. 16, 2006, the contents of which are hereby incorporated by reference in their entirety. In particular, the conversational language processor 130 may generally identify a conversational goal for the multi-modal interactions, wherein the conversational goal may be identifying from analyzing the utterance, the non-voice interactions, the most likely context, and/or the determined intent. As such, the conversational goal identified for the multi-modal interactions may generally control the cooperative conversation between the conversational language processor 130 and the user. For example, the conversational language processor 130 may generally engage the user in one or more query conversations, didactic conversations, and/or exploratory conversations to resolve or otherwise process the multi-modal interactions.

In particular, the conversational language processor 130 may engage the user in a query conversation in response to identifying that the conversational goal relates to retrieving discrete information or performing a particular function. Thus, in a cooperative query conversation, the user may lead the conversation towards achieving the particular conversational goal, while the conversational language processor 130 may initiate one or more queries, tasks, commands, or other requests to achieve the goal and thereby support the user in the conversation. In response to ambiguity or uncertainty in the intent of the multi-modal interaction, the conversational language processor 130 may engage the user in a didactic conversation to resolve the ambiguity or uncertainty (e.g., where noise or malapropisms interfere with interpreting the utterance, multiple likely contexts cannot be disambiguated, etc.). As such, in a cooperative didactic conversation, the conversational language processor 130 may lead the conversation to clarify the intent of the multi-modal interaction (e.g., generating feedback provided through an output device 114), while the user may regulate the conversation and provide additional multi-modal interactions to clarify the intent. In response to determining the intent of the multi-modal interactions with suitable confidence, with the intent indicating an ambiguous or uncertain goal, the conversational language processor 130 may engage the user in an exploratory conversation to resolve the goal. In a cooperative exploratory conversation, the conversational language processor 130 and the user may share leader and supporter roles, wherein the ambiguous or uncertain goal may be improvised or refined over a course of the conversation.

Thus, the conversational language processor 130 may generally engage in one or more cooperative conversations to determine the intent and resolve a particular goal for the multi-modal interactions received at the voice-enabled device 100. The conversational language processor 130 may then initiate one or more queries, tasks, commands, or other requests in furtherance of the intent and the goal determined for the multi-modal interactions. For example, in one implementation, the conversational language processor 130 may invoke one or more agents 132c having capabilities for processing requests in a particular domain or application 134, a voice search engine 132f having capabilities for retrieving information requested in the multi-modal interactions (e.g., from one or more data repositories 136, networks, or other information sources coupled to the voice-enabled device 100), or one or more other systems or multi-modal devices having suitable processing capabilities for furthering the intent and the goal for the multi-modal interactions (e.g., as determined from the constellation model 132b).

Additionally, in one implementation, the conversational language processor 130 may invoke an advertising application 134 in relation to the queries, tasks, commands, or other requests initiated to process the multi-modal interactions, wherein the advertising application 134 may be configured to select one or more advertisements that may be relevant to the intent and/or the goal for the multi-modal interactions, as described in co-pending U.S. patent application Ser. No. 11/671,526, entitled "System and Method for Selecting and Presenting Advertisements Based on Natural Language Processing of Voice-Based Input," filed Feb. 6, 2007, the contents of which are hereby incorporated by reference in their entirety.

In one implementation, in response to receiving results from any suitable combination of queries, tasks, commands, or other requests processed for the multi-modal interactions, the conversational language processor 130 may format the results for presentation to the user through the output device 114. For example, the results may be formatted into a natural language utterance that can be converted into an electronic signal and provided to the user through a speaker coupled to the output device 114, or the results may be visually presented on a display coupled to the output device 114, or in any other suitable manner (e.g., the results may indicate whether a particular task or command was successfully performed, or the results may include information retrieved in response to one or more queries, or the results may include a request to frame a subsequent multi-modal interaction if the results are ambiguous or otherwise incomplete, etc.).

Furthermore, in one implementation, the conversational language processor 130 may include a misrecognition engine 132e configured to determine whether the conversational language processor 130 incorrectly determined the intent for the multi-modal interactions. In one implementation, the misrecognition engine 132e may determine that the conversational language processor 130 incorrectly determined the intent in response to one or more subsequent multi-modal interactions provided proximately in time to the prior multi-modal interactions, as described in U.S. patent application Ser. No. 11/200,164, entitled "System and Method of Supporting Adaptive Misrecognition in Conversational Speech," which issued as U.S. Pat. No. 7,620,549 on Nov. 17, 2009, the contents of which are hereby incorporated by reference in their entirety. For example, the misrecognition engine 132e may monitor for one or more subsequent multi-modal interactions that include a stop word, override a current request, or otherwise indicate an unrecognized or misrecognized event. The misrecognition engine 132e may then determine one or more tuning parameters for various components associated with the ASR 120 and/or the conversational language processor 130 to improve subsequent interpretations.

Accordingly, as described in further detail above, the voice-enabled device 100 may generally include various natural language processing components and capabilities that may be used for hybrid processing in the natural language voice services environment. In particular, the voice-enabled device 100 may be configured to determine the intent for various multi-modal interactions that include any suitable combination of natural language utterances and/or non-voice interactions and process one or more queries, tasks, commands, or other requests based on the determined intent. Furthermore, as noted above and as will be described in greater detail below, one or more other systems and/or multi-modal devices may participate in determining the intent and processing the queries, tasks, commands, or other requests for the multi-modal interactions to provide a hybrid processing methodology, wherein the voice-enabled device 100 and the various other systems and multi-modal devices may each perform partial processing to determine the intent and otherwise process the multi-modal interactions in a cooperative manner. For example, in one implementation, hybrid processing in the natural language voice services environment may include one or more techniques described in U.S. Provisional Patent Application Ser. No. 61/259,827, entitled "System and Method for Hybrid Processing in a Natural Language Voice Services Environment," filed on Nov. 10, 2009, the contents of which are hereby incorporated by reference in their entirety.

Figure 2:
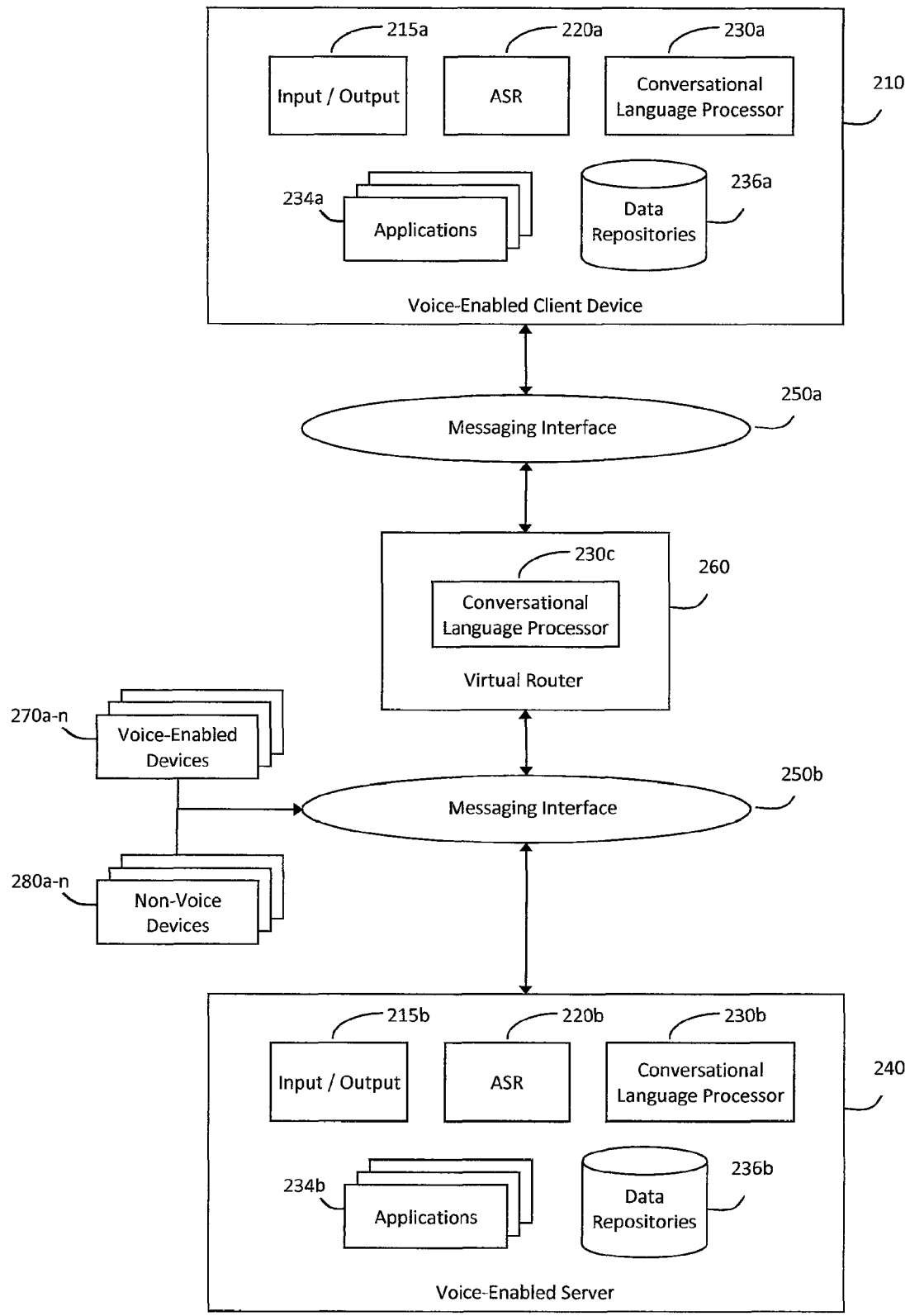
FIG. 2 illustrates a block diagram of an exemplary system for hybrid processing in a natural language voice service environment, according to one aspect of the invention.

According to one aspect of the invention, FIG. 2 illustrates a block diagram of an exemplary system for hybrid processing in a natural language voice service environment. In particular, the system illustrated in FIG. 2 may generally include a voice-enabled client device 210 similar to the voice-enabled device described above in relation to FIG. 1. For example, the voice-enabled client device 210 may include any suitable combination of input and output devices 215a respectively arranged to receive natural language multi-modal interactions and provide responses to the natural language multi-modal interactions. In addition, the voice-enabled client device 210 may include an Automatic Speech Recognizer (ASR) 220a configured to generate one or more preliminary interpretations of natural language utterances received at the input device 215a, and further configured to provide the preliminary interpretations to a conversational language processor 230a.

In one implementation, the conversational language processor 230a on the voice-enabled client device 210 may include one or more natural language processing components, which may be invoked to determine an intent for the multi-modal interactions received at the voice-enabled client device 210. The conversational language processor 230a may then initiate one or more queries, tasks, commands, or other requests to resolve the determined intent. For example, the conversational language processor 230a may invoke one or more applications 234a to process requests in a particular domain, query one or more data repositories 236a to retrieve information requested in the multi-modal interactions, or otherwise engage in one or more cooperative conversations with a user of the voice-enabled client device 210 to resolve the determined intent. Furthermore, as noted above in connection with FIG. 1, the voice-enabled client device 210 may also cooperate with one or more other systems or multi-modal devices having suitable processing capabilities for initiating queries, tasks, commands, or other requests to resolve the intent of the multi-modal interactions.

In particular, to cooperate with the other systems or multi-modal devices in the hybrid processing environment, the voice-enabled client device 210 may use a messaging interface 250a to communicative with a virtual router 260, wherein the messaging interface 250a may generally include a light client (or thin client) that provides a mechanism for the voice-enabled client device 210 to transmit input to and receive output from the virtual router 260. In addition, the virtual router 260 may further include a messaging interface 250b providing a mechanism for communicating with one or more additional voice-enabled devices 270a-n, one or more non-voice devices 280a-n, and a voice-enabled server 240. Furthermore, although FIG. 2 illustrates messaging interface 250a and messaging interface 250b as components that are distinct from the devices to which they are communicatively coupled, it will be apparent that such illustration is for ease of description only, as the messaging interfaces 250a-b may be provided as on-board components that execute on the various devices illustrated in FIG. 2 to facilitate communication among the various devices in the hybrid processing environment.

For example, in one implementation, the messaging interface 250a that executes on the voice-enabled client device 210 may transmit input from the voice-enabled client device 210 to the virtual router 260 within one or more XML messages, wherein the input may include encoded audio corresponding to natural language utterances, preliminary interpretations of the natural language utterances, data corresponding to multi-touch gestures, point of focus or attention focus selections, and/or other multi-modal interactions. In one implementation, the virtual router 260 may then further process the input using a conversational language processor 230c having capabilities for speech recognition, intent determination, adaptive misrecognition, and/or other natural language processing. Furthermore, the conversational language processor 230c may include knowledge relating to content, services, applications, natural language processing capabilities, and other features available through the various devices in the hybrid processing environment.

As such, in one implementation, the virtual router 260 may further communicate with the voice-enabled devices 270, the non-voice devices 280, and/or the voice-enabled server 240 through the messaging interface 250b to coordinate processing for the input received from the voice-enabled client device 210. For example, based on the knowledge relating to the features and capabilities of the various devices in the hybrid processing environment, the virtual router 260 may identify one or more of the devices that have suitable features and/or capabilities for resolving the intent of the input received from the voice-enabled client device 210. The virtual router 260 may then forward one or more components of the input to the identified devices through respective messaging interfaces 250b, wherein the identified devices may be invoked to perform any suitable processing for the components of the input forwarded from the virtual router 260. In one implementation, the identified devices may then return any results of the processing to the virtual router 260 through the respective messaging interfaces 250b, wherein the virtual router 260 may collate the results of the processing and return the results to the voice-enabled client device 210 through the messaging interface 250a.

Accordingly, the virtual router 260 may communicate with any of the devices available in the hybrid processing environment through messaging interfaces 250a-b to coordinate cooperative hybrid processing for multi-modal interactions or other natural language inputs received from the voice-enabled client device 210. For example, in one implementation, the cooperative hybrid processing may be used to enhance performance in embedded processing architectures in which the voice-enabled client device 210 includes a constrained amount of resources (e.g., the voice-enabled client device 210 may be a mobile device having a limited amount of internal memory or other dedicated resources for natural language processing). As such, when the voice-enabled client device 210 has an embedded processing architecture, one or more components of the voice-enabled client device 210 may be configured to optimize efficiency of on-board natural language processing to reduce or eliminate bottlenecks, lengthy response times, or degradations in performance.

For example, in one implementation, optimizing the efficiency of the on-board natural language processing may include configuring the ASR 220a to use a virtual dictation grammar having decoy words for out-of-vocabulary words, reduced vocabularies derived from a conversation history, or other dynamic recognition grammars (e.g., grammars optimized for particular languages, contexts, domains, memory constraints, and/or other suitable criteria). In another example, the on-board applications 234a and/or data repositories 236a may be associated with an embedded application suite providing particular features and capabilities for the voice-enabled client device 210. For example, the voice-enabled client device 210 may be embedded within an automotive telematics system, a personal navigation device, a global positioning system, a mobile phone, or another device in which users often request location-based services. Thus, in such circumstances, the on-board applications 234a and the data repositories 236a in the embedded application suite may be optimized to provide certain location-based services that can be efficiently processed on-board (e.g., destination entry, navigation, map control, music search, hands-free dialing, etc.).

Furthermore, although the components of the voice-enabled client device 210 may be optimized for efficiency in embedded architectures, a user may nonetheless request any suitable content, services, applications, and/or other features available in the hybrid processing environment, and the other devices in the hybrid processing environment may collectively provide natural language processing capabilities to supplement the embedded natural language processing capabilities for the voice-enabled client device 210. For example, the voice-enabled client device 210 may perform preliminary processing for a particular multi-modal interaction using the embedded natural language processing capabilities (e.g., the on-board ASR 220a may perform advanced virtual dictation to partially transcribe an utterance in the multi-modal interaction, the on-board conversational language processor 230a may determine a preliminary intent of the multi-modal interaction, etc.), wherein results of the preliminary processing may be provided to the virtual router 260 for further processing.

In one implementation, the voice-enabled client device 210 may also communicate input corresponding to the multi-modal interaction to the virtual router 260 in response to determining that on-board capabilities cannot suitably interpret the interaction (e.g., if a confidence level for a partial transcription does not satisfy a particular threshold), or in response to determining that the interaction should be processed off-board (e.g., if a preliminary interpretation indicates that the interaction relates to a local search request requiring large computations to be performed on the voice-enabled server 240). As such, the virtual router 260 may capture the input received from the voice-enabled client device 210 and coordinate further processing among the voice-enabled devices 270 and the voice-enabled server 240 that provide natural language processing capabilities in addition to the non-voice devices 280 that provide capabilities for retrieving data or executing tasks. Furthermore, in response to the virtual router 260 invoking one or more of the voice-enabled devices 270, the input provided to the voice-enabled devices 270 may be optimized to suit the processing requested from the invoked voice-enabled devices 270 (e.g., to avoid over-taxing processing resources, a particular voice-enabled device 270 may be provided a partial transcription or a preliminary interpretation and resolve the intent for a given context or domain).

Alternatively, in response to the virtual router 260 invoking the voice-enabled server 240, the input provided to the voice-enabled devices 270 may further include encoded audio corresponding to natural language utterances and any other data associated with the multi-modal interaction. In particular, as shown in FIG. 2, the voice-enabled server 240 may have a natural language processing architecture similar to the voice-enabled client device 210, except that the voice-enabled server 240 may include substantial processing resources that obviate constraints that the voice-enabled client device 210 may be subject to. Thus, when the voice-enabled server 240 cooperates in the hybrid processing for the multi-modal interaction, the encoded audio corresponding to the natural language utterances and the other data associated with the multi-modal interaction may be provided to the voice-enabled server 240 to maximize a likelihood of the voice-enabled server 240 correctly determining the intent of the multi-modal interaction (e.g., the ASR 220b may perform multi-pass speech recognition to generate an accurate transcription for the natural language utterance, the conversational language processor 230b may arbitrate among intent determinations performed in any number of different contexts or domains, etc.). Accordingly, in summary, the hybrid processing techniques performed in the environment illustrated in FIG. 2 may generally include various different devices, which may or may not include natural language capabilities, cooperatively determining the intent of a particular multi-modal interaction and taking action to resolve the intent.

Although the cooperative hybrid processing techniques described above have been particularly described in the context of an embedded processing architecture, such techniques are not necessarily limited to embedded processing architectures. In particular, the same techniques may be applied in any suitable voice services environment having various devices that can cooperate to initiate queries, tasks, commands, or other requests to resolve the intent of multi-modal interactions. Furthermore, in one implementation, the voice-enabled client device 210 may include a suitable amount of memory or other resources that can be dedicated to natural language processing (e.g., the voice-enabled client device 210 may be a desktop computer or other device that can process natural language without substantially degraded performance). In such circumstances, one or more of the components of the voice-enabled client device 210 may be configured to optimize the on-board natural language processing in a manner that could otherwise cause bottlenecks, lengthy response times, or degradations in performance in an embedded architecture. For example, in one implementation, optimizing the on-board natural language processing may include configuring the ASR 220a to use a large list dictation grammar in addition to and/or instead of the virtual dictation grammar used in embedded processing architectures.

Nonetheless, as will be described in greater detail below in connection with FIGS. 3-5, the cooperative hybrid processing techniques may be substantially similar regardless of whether the voice-enabled client device 210 has an embedded or non-embedded architecture. In particular, regardless of the architecture for the voice-enabled client device 210, cooperative hybrid processing may include the voice-enabled client device 210 optionally performing preliminary processing for a natural language multi-modal interaction and communicating input corresponding to the multi-modal interaction to the virtual router 260 for further processing through the messaging interface 250a. Alternatively (or additionally), the cooperative hybrid processing may include the virtual router 260 coordinating the further processing for the input among the various devices in the hybrid environment through messaging interface 250b, and subsequently returning any results of the processing to the voice-enabled client device 210 through messaging interface 250a.

Figure 3:
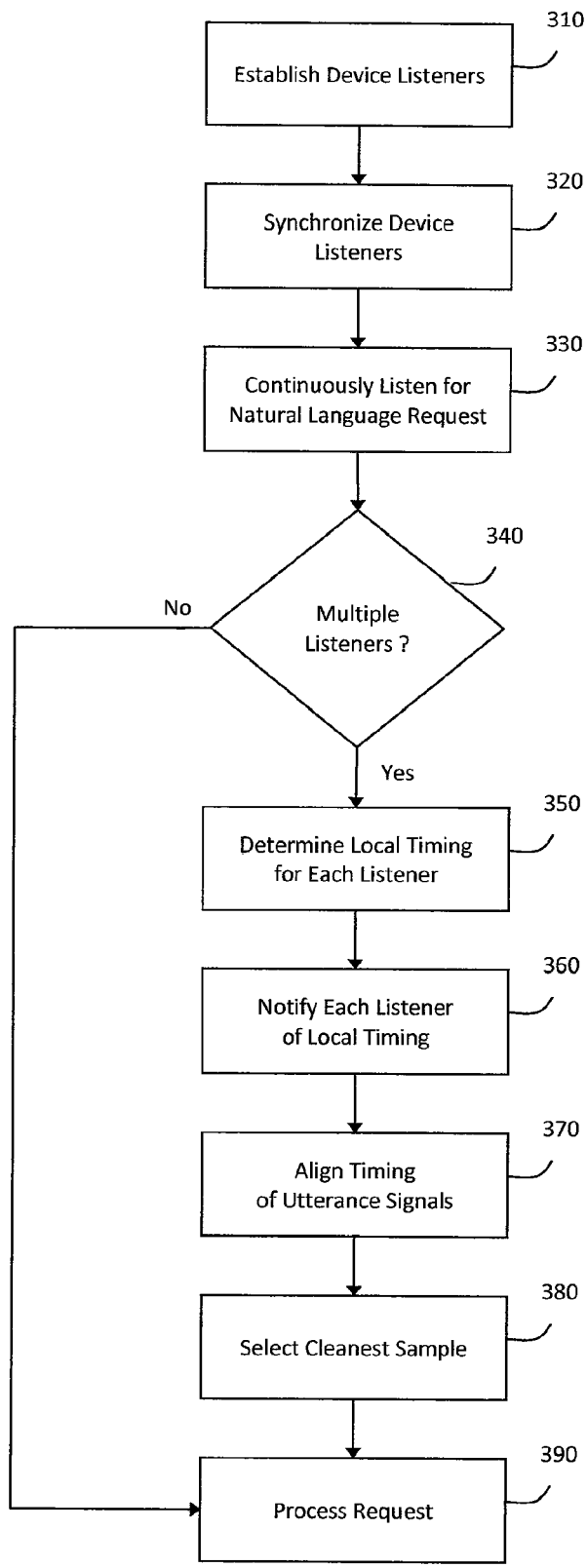
FIG. 3 illustrates a flow diagram of an exemplary method for initializing various devices that cooperate to perform hybrid processing in a natural language voice services environment, according to one aspect of the invention.

According to various aspects of the invention, FIG. 3 illustrates a flow diagram of an exemplary method for initializing various devices that cooperate to perform hybrid processing in a natural language voice services environment. In particular, as noted above, the hybrid processing environment may generally include communication among various different devices that may cooperatively process natural language multi-modal interactions. For example, in one implementation, the various devices in the hybrid processing environment may include a virtual router having one or more messaging interfaces for communicating with one or more voice-enabled devices, one or more non-voice devices, and/or a voice-enabled server. As such, in one implementation, the method illustrated in FIG. 3 may be used to initialize communication in the hybrid processing environment to enable subsequent cooperative processing for one or more natural language multi-modal interactions received at any particular device in the hybrid processing environment.

In one implementation, the various devices in the hybrid processing environment may be configured to continually listen or otherwise monitor respective input devices to determine whether a natural language multi-modal interaction has occurred. As such, the method illustrated in FIG. 3 may be used to calibrate, synchronize, or otherwise initialize the various devices that continually listen for the natural language multi-modal interactions. For example, as described above in connection with FIG. 2, the virtual router, the voice-enabled devices, the non-voice devices, the voice-enabled server, and/or other devices in the hybrid processing environment may be configured to provide various different capabilities or services, wherein the initialization method illustrated in FIG. 3 may be used to ensure that the hybrid processing environment obtains a suitable signal to process any particular natural language multi-modal interaction and appropriately invoke one or more of the devices to cooperatively process the natural language multi-modal interaction. Furthermore, the method illustrated in FIG. 3 and described herein may be invoked to register the various devices in the hybrid processing environment, register new devices added to the hybrid processing environment, publish domains, services, intent determination capabilities, and/or other features supported on the registered devices, synchronize local timing for the registered devices, and/or initialize any other suitable aspect of the devices in the hybrid processing environment.

In one implementation, initializing the various devices in the hybrid processing environment may include an operation 310, wherein a device listener may be established for each of the devices in the hybrid processing environment. The device listeners established in operation 310 may generally include any suitable combination of instructions, firmware, or other routines that can be executed on the various devices to determine capabilities, features, supported domains, or other information associated with the devices. For example, in one implementation, the device listeners established in operation 310 may be configured to communicate with the respective devices using the Universal Plug and Play protocol designed for ancillary computer devices, although it will be apparent that any appropriate mechanism for communicating with the various devices may be suitably substituted.

In response to establishing the device listeners for each device registered in the hybrid processing environment (or in response to establishing device listeners for any device newly registered in the hybrid processing environment), the device listeners may then be synchronized in an operation 320. In particular, each of the registered devices may have an internal clock or other timing mechanism that indicates local timing for an incoming natural language multi-modal interaction, wherein operation 320 may be used to synchronize the device listeners established in operation 310 according to the internal clocks or timing mechanisms for the respective devices. Thus, in one implementation, synchronizing the device listeners in operation 320 may include each device listener publishing information relating to the internal clock or local timing for the respective device. For example, the device listeners may publish the information relating to the internal clock or local timing to the virtual router, whereby the virtual router may subsequently coordinate cooperative hybrid processing for natural language multi-modal interactions received at one or more of the devices in the hybrid processing environment. It will be apparent, however, that the information relating to the internal clock or local timing for the various devices in the hybrid processing environment may be further published to the other voice-enabled devices, the other non-voice devices, the voice-enabled server, and/or any other suitable device that may participate in cooperative processing for natural language multi-modal interactions provided to the hybrid processing environment.

In one implementation, in response to establishing and synchronizing the device listeners for the various devices registered in the hybrid processing environment, the device listeners may continually listen or otherwise monitor respective devices on the respective registered devices in an operation 330 to detect information relating to one or more natural language multi-modal interactions. For example, the device listeners may be configured to detect occurrences of the natural language multi-modal interactions in response to detecting an incoming natural language utterance, a point of focus or attention focus selection associated with an incoming natural language utterance, and/or another interaction or sequence of interactions that relates to an incoming natural language multi-modal interaction. In addition, operation 330 may further include the appropriate device listeners capturing the natural language utterance and/or related non-voice device interactions that relate to the natural language utterance.

In one implementation, the captured natural language utterance and related non-voice device interactions may then be analyzed in an operation 340 to manage subsequent cooperative processing in the hybrid processing environment. In one implementation, for example, operation 340 may determine whether one device listener or multiple device listeners captured information relating to the natural language multi-modal interaction detected in operation 330. In particular, as noted above, the hybrid processing environment may generally include various different devices that cooperate to process natural language multi-modal interactions, whereby the information relating to the natural language multi-modal interaction may be provided to one or a plurality of the devices in the hybrid processing environment. As such, operation 340 may determine whether one device listener or multiple device listeners captured the information relating to the natural language multi-modal interaction in order to determine whether the hybrid processing environment needs to synchronize signals among various device listeners that captured information relating to the multi-modal interaction.

For example, a user interacting with the hybrid processing environment may view a web page presented on a non-voice display device and provide a natural language multi-modal interaction that requests more information about purchasing a product displayed on the web page. The user may then select text on the web page containing the product name using a mouse, keyboard, or other non-voice input device and provide a natural language utterance to a microphone or other voice-enabled device such as "Is this available on Amazon.com?" In this example, a device listener associated with the non-voice display device may detect the text selection for the product name in operation 330, and a device listener associated with the voice-enabled device may further detect the natural language utterance inquiring about the availability of the product in operation 330. Furthermore, in one implementation, the user may be within a suitable range of multiple voice-enabled devices, which may result in multiple device listeners capturing different signals corresponding to the natural language utterance (e.g., the interaction may occur within range of a voice-enabled mobile phone, a voice-enabled telematics device, and/or other voice-enabled devices, depending on the arrangement and configuration of the various devices in the hybrid processing environment).

Accordingly, as will be described in greater detail herein, a sequence of operations that synchronizes different signals relating to the multi-modal interaction received at the multiple device listeners may be initiated in response to operation 340 determining that multiple device listeners captured information relating to the natural language multi-modal interaction. On the other hand, in response to operation 340 determining that only one device listener captured information relating to the natural language multi-modal interaction, the natural language multi-modal interaction may be processed in an operation 390 without executing the sequence of operations that synchronizes different signals (i.e., the one device listener provides all of the input information relating to the multi-modal interaction, such that hybrid processing for the interaction may be initiated in operation 390 without synchronizing different input signals). However, in one implementation, the sequence of synchronization operations may also be initiated in response to one device listener capturing a natural language utterance and one or more non-voice interactions to align different signals relating to the natural language multi-modal interaction, as described in greater detail herein.

As described above, each device listener that receives an input relating to the natural language multi-modal interaction detected in operation 330 may have an internal clock or other local timing mechanism. As such, in response to determining that one or more device listeners captured different signals relating to the natural language multi-modal interaction in operation 340, the sequence of synchronization operations for the different signals may be initiated in an operation 350. In particular, operation 350 may include the one or more device listeners determining local timing information for the respective signals based on the internal clock or other local timing mechanism associated with the respective device listeners, wherein the local timing information determined for the respective signals may then be synchronized.

For example, in one implementation, synchronizing the local timing information for the respective signals may be initiated in an operation 360. In particular, operation 360 may generally include notifying each device listener that received an input relating to the multi-modal interaction of the local timing information determined for each respective signal. For example, in one implementation, each device listener may provide local timing information for a respective signal to the virtual router, and the virtual router may then provide the local timing information for all of the signals to each device listener. As such, in one implementation, operation 360 may result in each device listener receiving a notification that includes local timing information for each of the different signals that relate to the natural language multi-modal interaction detected in operation 330. Alternatively (or additionally), the virtual router may collect the local timing information for each of the different signals from each of the device listeners and further synchronize the local timing information for the different signals to enable hybrid processing for the natural language multi-modal interaction.

In one implementation, any particular natural language multi-modal interaction may include at least a natural language utterance, and may further include one or more additional device interactions relating to the natural language utterance. As noted above, the utterance may generally be received prior to, contemporaneously with, or subsequent to the additional device interactions. As such, the local timing information for the different signals may be synchronized in an operation 370 to enable hybrid processing for the natural language multi-modal interaction. In particular, operation 370 may include aligning the local timing information for one or more signals corresponding to the natural language utterance and/or one or more signals corresponding to any additional device interactions that relate to the natural language utterance. In addition, operation 370 may further include aligning the local timing information for the natural language utterance signals with the signals corresponding to the additional device interactions.

Thus, in matching the utterance signals and the non-voice device interaction signals, any devices that participate in the hybrid processing for the natural language multi-modal interaction may be provided with voice components and/or non-voice components that have been aligned with one another. For example, in one implementation, operation 370 may be executed on the virtual router, which may then provide the aligned timing information to any other device that may be invoked in the hybrid processing. Alternatively (or additionally), one or more of the other devices that participate in the hybrid processing may locally align the timing information (e.g., in response to the virtual router invoking the voice-enabled server in the hybrid processing, resources associated with the voice-enabled server may be employed to align the timing information and preserve communication bandwidth at the virtual router).

Furthermore, in one implementation, the virtual router and/or other devices in the hybrid processing environment may analyze the signals corresponding to the natural language utterance in an operation 380 to select the cleanest sample for further processing. In particular, as noted above, the virtual router may include a messaging interface for receiving an encoded audio sample corresponding to the natural language utterance from one or more of the voice-enabled devices. For example, the audio sample received at the virtual router may include the natural language utterance encoded in the MPEG-1 Audio Layer 3 (MP3) format or another lossy format to preserve communication bandwidth in the hybrid processing environment. However, it will be apparent that the audio sample may alternatively (or additionally) be encoded using the Free Lossless Audio Codec (FLAC) format or another lossless format in response to the hybrid processing environment having sufficient communication bandwidth for processing lossless audio that may provide a better sample of the natural language utterance.

Regardless of whether the audio sample has been encoded in a lossy or lossless format, the signal corresponding to the natural language utterance that provides the cleanest sample may be selected in operation 380. For example, one voice-enabled device may be in a noisy environment or otherwise associated with conditions that interfere with generating a clean audio sample, while another voice-enabled device may include a microphone array or be configured to employ techniques that maximize fidelity of encoded speech. As such, in response to multiple signals corresponding to the natural language utterance being received in operation 330, the cleanest signal may be selected in operation 380 and hybrid processing for the natural language utterance may then be initiated in an operation 390.

Accordingly, the synchronization and initialization techniques illustrated in FIG. 3 and described herein may ensure that the hybrid processing environment synchronizes each of the signals corresponding to the natural language multi-modal interaction and generates an input for further processing in operation 390 most likely to result in a correct intent determination. Furthermore, in synchronizing the signals and selecting the cleanest audio sample for the further processing in operation 390, the techniques illustrated in FIG. 3 and described herein may ensure that none of the devices in the hybrid processing environment take action on a natural language multi-modal interaction until the appropriate signals to be used in operation 390 have been identified. As such, hybrid processing for the natural language multi-modal interaction may be initiated in operation 390, as described in further detail herein.

Figure 4:
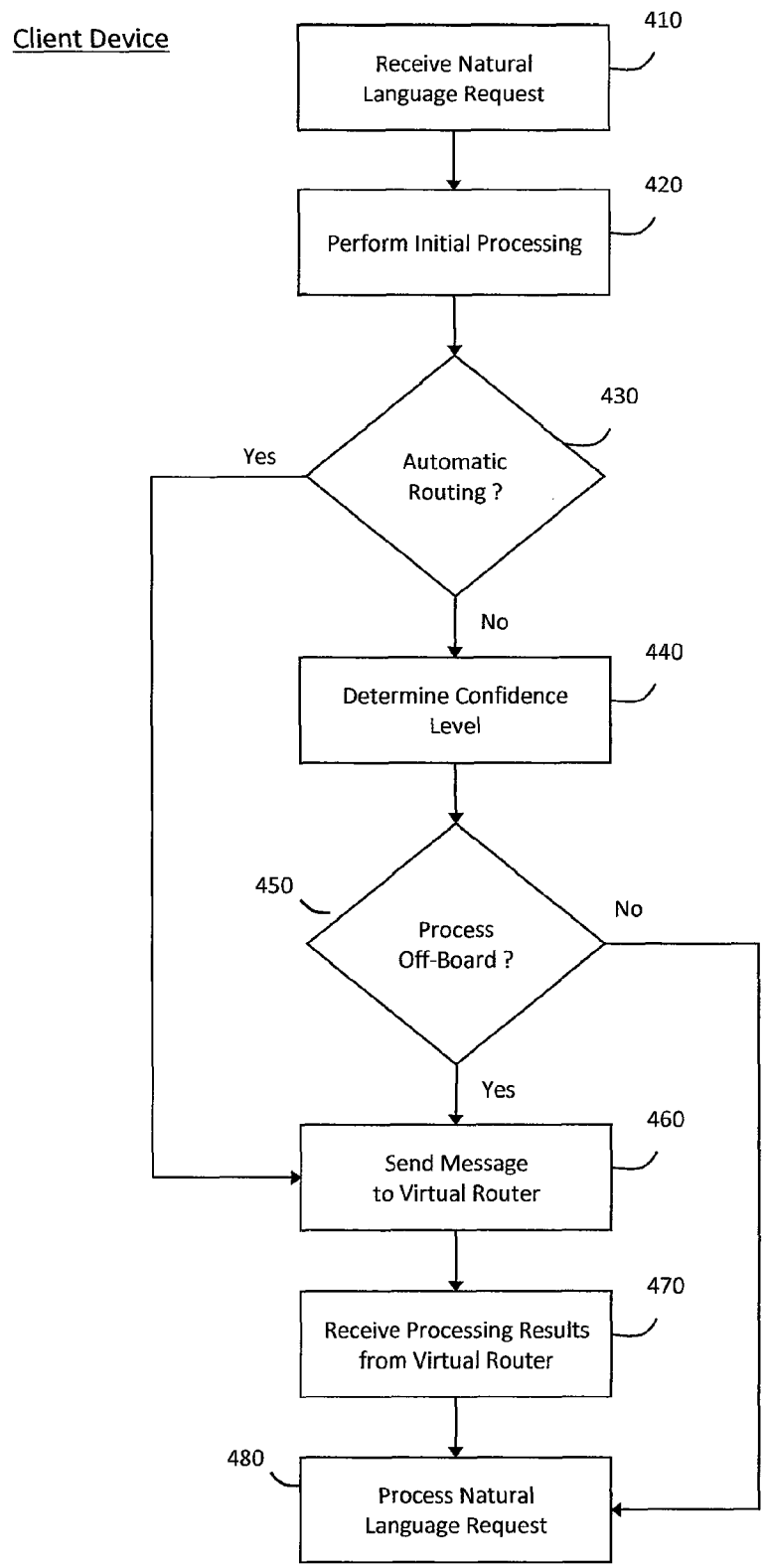
FIGS. 4-5 illustrate flow diagrams of exemplary methods for hybrid processing in a natural language voice services environment, according to one aspect of the invention.

According to one aspect of the invention, FIG. 4 illustrates a flow diagram of am exemplary method for performing hybrid processing at one or more client devices in a natural language voice services environment. In particular, as will be described in greater below with reference to FIG. 5, the one or more client devices may perform the hybrid processing in cooperation with a virtual router through a messaging interface that communicatively couples the client devices and the virtual router. For example, in one implementation, the messaging interface may generally include a light client (or thin client) that provides a mechanism for the client devices to transmit input relating to a natural language multi-modal interaction to the virtual router, and that further provides a mechanism for the client devices to receive output relating to the natural language multi-modal interaction from the virtual router.

For example, in one implementation, the hybrid processing at the client devices may be initiated in response to one or more of the client devices receiving a natural language multi-modal interaction in an operation 410. In particular, the natural language multi-modal interaction may generally include a natural language utterance received at a microphone or other voice-enabled input device coupled to the client device that received the natural language multi-modal interaction, and may further include one or more other additional input modalities that relate to the natural language utterance (e.g., text selections, button presses, multi-touch gestures, etc.). As such, the natural language multi-modal interaction received in operation 410 may include one or more queries, commands, or other requests provided to the client device, wherein the hybrid processing for the natural language multi-modal interaction may then be initiated in an operation 420.

As described in greater detail above, the natural language voice services environment may generally include one or more voice-enabled client devices, one or more non-voice devices, a voice-enabled server, and a virtual router arranged to communicate with each of the voice-enabled client devices, the non-voice devices, and the voice-enabled server. In one implementation, the virtual router may therefore coordinate the hybrid processing for the natural language multi-modal interaction among the voice-enabled client devices, the non-voice devices, and the voice-enabled server. As such, the hybrid processing techniques described herein may generally refer to the virtual router coordinating cooperative processing for the natural language multi-modal interaction in a manner that involves resolving an intent of the natural language multi-modal interaction in multiple stages.

In particular, as described above in connection with FIG. 3, the various devices that cooperate to perform the hybrid processing may be initialized to enable the cooperative processing for the natural language multi-modal interaction. As such, in one implementation, in response to initializing the various devices, each of the client devices that received an input relating to the natural language multi-modal interaction may perform initial processing for the respective input in an operation 420. For example, in one implementation, a client device that received the natural language utterance included in the multi-modal interaction may perform initial processing in operation 420 that includes encoding an audio sample corresponding to the utterance, partially or completely transcribing the utterance, determining a preliminary intent for the utterance, or performing any other suitable preliminary processing for the utterance. In addition, the initial processing in operation 420 may also be performed at a client device that received one or more of the additional input modalities relating to the utterance. For example, the initial processing performed in operation 420 for the additional input modalities may include identifying selected text, selected points of focus or attention focus, or generating any other suitable data that can be used to further interpret the utterance. In one implementation, an operation 430 may then include determining whether the hybrid processing environment has been configured to automatically route inputs relating to the natural language multi-modal interaction to the virtual router.

For example, in one implementation, operation 430 may determine that automatic routing has been configured to occur in response to multiple client devices receiving the natural language utterance included in the multi-modal interaction in operation 410. In this example, the initial processing performed in operation 420 may include the multiple client devices encoding respective audio samples corresponding to the utterance, wherein messages that include the encoded audio samples may then be sent to the virtual router in an operation 460. The virtual router may then select one of the encoded audio samples that provides a cleanest signal and coordinate subsequent hybrid processing for the natural language multi-modal interaction, as will be described in greater detail below with reference to FIG. 5. In another example, operation 430 may determine that automatic routing has been configured to occur in response to the initial processing resulting in a determination that the multi-modal interaction relates to a request that may be best suited for processing on the voice-enabled server (e.g., the request may relate to a location-based search query or another command or task that requires resources managed on the voice-enabled server, content, applications, domains, or other information that resides on one or more devices other than the client device that received the request, etc.). However, it will be apparent that the hybrid processing environment may be configured for automatic routing in response to other conditions and/or regardless of whether any attendant conditions exist, as appropriate.

In one implementation, in response to the virtual router coordinating the hybrid processing for the natural language multi-modal interaction, the virtual router may provide results of the hybrid processing to the client device in an operation 470. For example, the results provided to the client device in operation 470 may include a final intent determination for the natural language multi-modal interaction, information requested in the interaction, data generated in response to executing a command or task requested in the interaction, and/or other results that enable the client device to complete processing for the natural language request in operation 480. For example, in one implementation, operation 480 may include the client device executing a query, command, task, or other request based on the final intent determination returned from the virtual router, presenting the requested information returned from the virtual router, confirming that the requested command or task has been executed, and/or performing any additional processing to resolve the natural language request.

Referring back to operation 430, in response to determining that the conditions that trigger automatic routing have not been satisfied or that automatic router has otherwise not been configured, the client device may further process the natural language multi-modal interaction in an operation 440. In one implementation, the further processing in operation 440 may include the client device attempting to determine an intent for the natural language multi-modal interaction using local natural language processing capabilities. For example, the client device may merge any non-voice input modalities included in the multi-modal interaction a transcription for the utterance included in the multi-modal interaction. The conversational language processor on the client device may then determine the intent for the multi-modal interaction utilizing local information relating to context, domains, shared knowledge, criteria values, or other information. The client device may then generate one or more interpretations for the utterance to determine the intent for the multi-modal interaction (e.g., identifying a conversation type, one or more requests contained in the interactions, etc.).

In one implementation, operation 440 may further include determining a confidence level for the intent determination generated on the client device (e.g., the confidence level may be derived in response to whether the client devices includes a multi-pass speech recognition engine, whether the utterance contained any ambiguous words or phrases, whether the intent differs from one context to another, etc.). In one implementation, an operation 450 may then determine whether or not to invoke off-board processing depending on the confidence level determined in operation 440. For example, operation 450 may generally include determining whether the intent determined in operation 440 satisfies a particular threshold value that indicates an acceptable confidence level for taking action on the determined intent. As such, in response to the confidence level for the intent determination satisfying the threshold value, operation 450 may determine to not invoke off-board processing. In particular, the confidence level satisfying the threshold value may indicate that the client device has sufficient information to take action on the determined intent, whereby the client device may then process one or more queries, commands, tasks, or other requests to resolve the multi-modal interaction in operation 480.

Alternatively, in response to the confidence level for the intent determination failing to satisfy the threshold value, operation 450 may invoke off-board processing, which may include sending one or more messages to the virtual router in operation 460. The one or more messages may cause the virtual router to invoke additional hybrid processing for the multi-modal interaction in a similar manner as noted above, and as will be described in greater detail herein with reference to FIG. 5.

Figure 5:
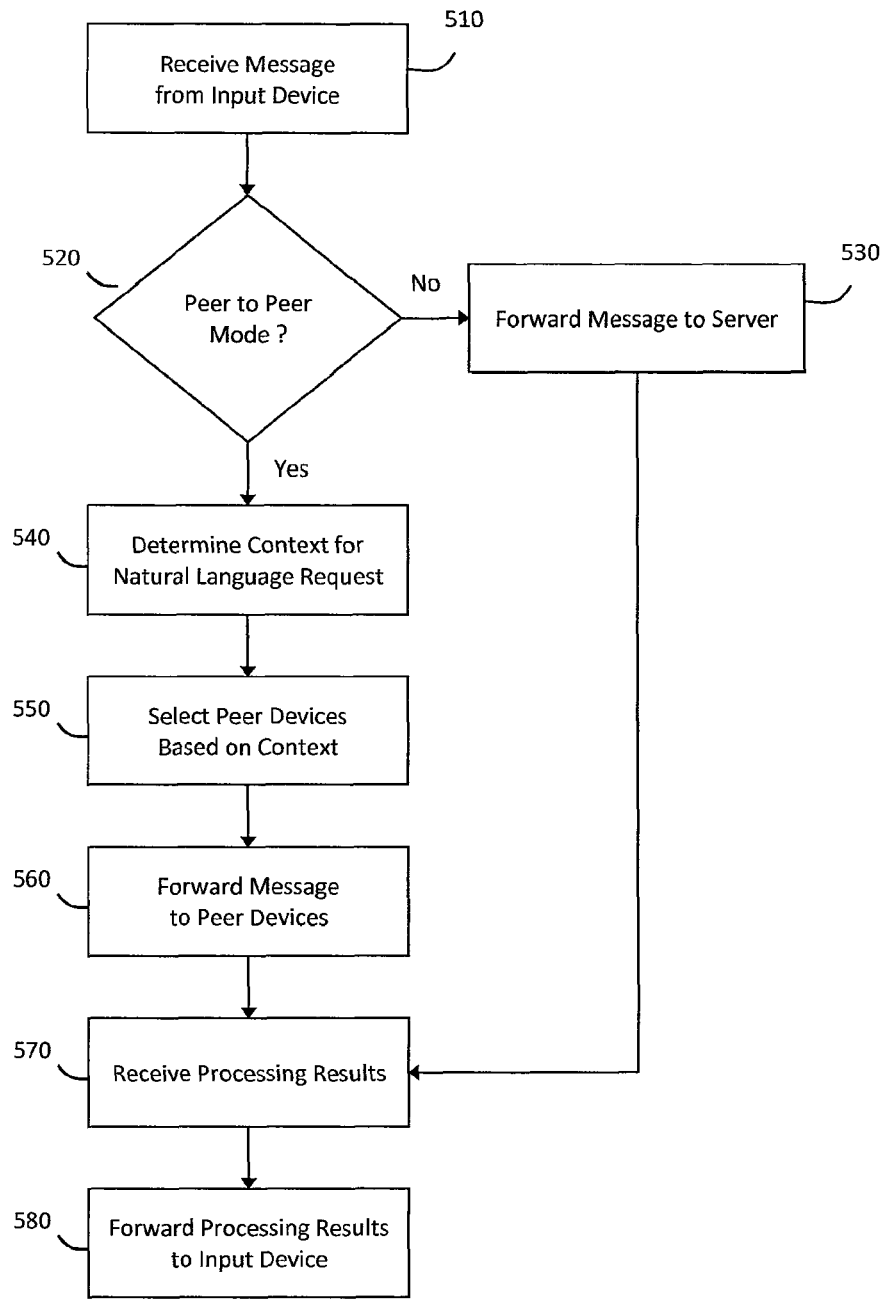

According to one aspect of the invention, FIG. 5 illustrates a flow diagram of am exemplary method for performing hybrid processing at a virtual router in a natural language voice services environment. In particular, as the virtual router may coordinate the hybrid processing for natural language multi-modal interactions received at one or more client devices. In one implementation, in an operation 510, the virtual router may receive one or more messages relating to a natural language multi-modal interaction received at one or more of the client devices in the voice services environment. For example, the virtual router may include a messaging interface that communicatively couples the virtual router to the client devices and a voice-enabled server, wherein the messaging interface may generally include a light client (or thin client) that provides a mechanism for the virtual router to receive input from one or more the client devices and/or the voice-enabled server, and further to transmit output to one or more the client devices and/or the voice-enabled server. The messages received in operation 510 may generally include any suitable processing results for the multi-modal interactions, whereby the virtual router may coordinate hybrid processing in a manner that includes multiple processing stages that may occur at the virtual router, one or more of the client devices, the voice-enabled server, or any suitable combination thereof.

In one implementation, the virtual router may analyze the messages received in operation 510 to determine whether to invoke the hybrid processing in a peer-to-peer mode. For example, one or more of the messages may include a preliminary intent determination that the virtual router can use to determine whether to invoke one or more of the client devices, the voice-enabled server, or various combinations thereof in order to execute one or more of the multiple processing stages for the multi-modal interaction. In another example, one or more of the messages may include an encoded audio sample that the virtual router forwards to one or more of the various devices in the hybrid processing environment. As such, in one implementation, the virtual router may analyze the messages received in operation 510 to determine whether or not to invoke the voice-enabled server to process the multi-modal interaction (e.g., the messages may include a preliminary intent determination that indicates that the multi-modal interaction includes a location-based request that requires resources residing on the server).

In response to the virtual router determining to invoke the voice-enabled server, the virtual router may forward the messages to the server in an operation 530. In particular, the messages forwarded to the server may generally include the encoded audio corresponding to the natural language utterance and any additional information relating to other input modalities relevant to the utterance. For example, as described in greater detail above with reference to FIG. 2, the voice-enabled server may include various natural language processing components that can suitably determine the intent of the multi-modal interaction, whereby the messages sent to the voice-enabled server may include the encoded audio in order to permit the voice-enabled server to determine the intent independently of any preliminary processing on the client devices that may be inaccurate or incomplete. In response to the voice-enabled server processing the messages received from the virtual router, results of the processing may then be returned to the virtual router in an operation 570. For example, the results may include the intent determination for the natural language multi-modal interaction, results of any queries, commands, tasks, or other requests performed in response to the determined intent, or any other suitable results, as will be apparent.

Alternatively, in response to the virtual router determining to invoke the peer-to-peer mode in operation 520, the virtual router may coordinate the hybrid processing among one or more the client devices, the voice-enabled server, or any suitable combination thereof. For example, in one implementation, the virtual router may determine a context for the natural language multi-modal interaction in an operation 540 and select one or more peer devices based on the determined context in an operation 550. For example, one or more of the client devices may be configured to provide content and/or services in the determined context, whereby the virtual router may forward one or more messages to such devices in an operation 560 in order to request such content and/or services. In another example, the multi-modal interaction may include a compound request that relates to multiple contexts supported on different devices, whereby the virtual router may forward messages to each such device in operation 560 in order to request appropriate content and/or services in the different contexts.

In still another example, the interaction may include a request to be processed on the voice-enabled server, yet the request may require content and/or services that reside on one or more of the client devices (e.g., a location-based query relating to an entry in an address book on one or more of the client devices). As such, the virtual router may generally forward various messages to the selected peer devices in operation 560 to manage the multiple stages in the hybrid processing techniques described herein. For example, the virtual router may send messages to one or more voice-enabled client devices that have intent determination capabilities in a particular context, one or more non-voice client devices that have access to content, services, and/or other resources needed to process the multi-modal interaction, or any appropriate combination thereof. The virtual router may therefore send messages to the client devices and/or the voice-enabled server in operation 560 and receive responsive messages from the client devices and/or the voice-enabled server in operation 570 in any appropriate manner (e.g., in parallel, sequentially, iteratively, etc.). The virtual router may then collate the results received in the responsive messages in operation 580 and return the results to one or more of the client devices for any final processing and/or presentation of the results.

Figure 6:
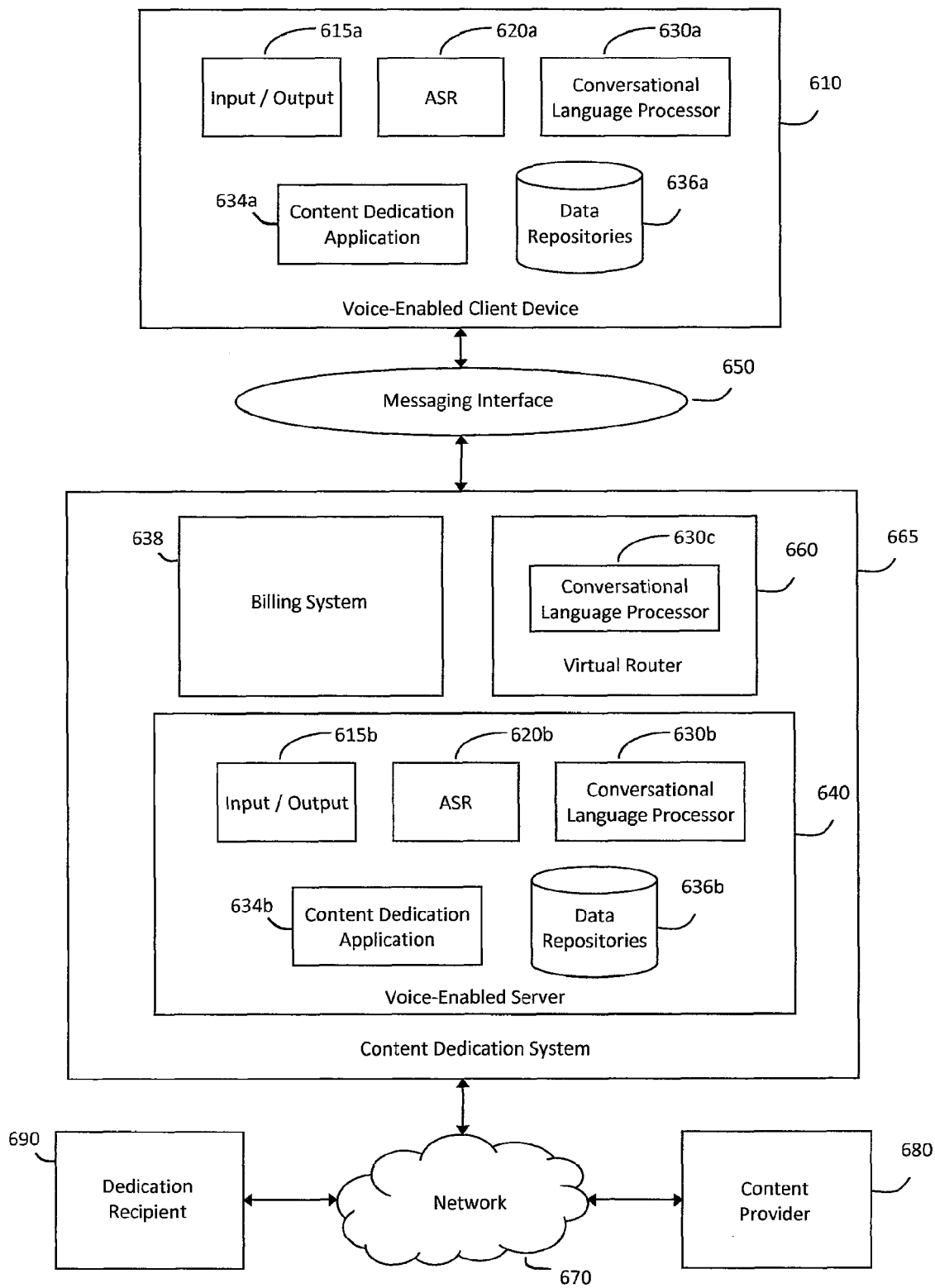
FIG. 6 illustrates a block diagram of an exemplary system for providing a natural language content dedication service, according to one aspect of the invention.

According to one aspect of the invention, FIG. 6 illustrates a block diagram of an exemplary system for providing a natural language content dedication service. In particular, as shown in FIG. 6, the system for providing the natural language content dedication service may generally include a voice-enabled client device 610 that can communicate with a content dedication system 665 through a messaging interface 665. In one implementation, the voice-enabled client device 610 may communicate with the content dedication system 665 in a similar manner as described above with reference to FIGS. 2 through 5. For example, the content dedication system 665 may include a virtual router 660 and a voice-enabled server 640 that can service multi-modal natural language requests provided to the voice-enabled client device 610 in a similar manner as described above, and may further include a billing system 638 that may be used to process transactions relating to the content dedication service. Further, although FIG. 6 illustrates the content dedication system 665 as including the virtual router 660, the voice-enabled server 640, and the billing system 638 within one component, such illustration will be understood to be for ease of description only, and that the virtual router 660, the voice-enabled server 640, and the billing system 638 may in fact be arranged within any number of components that can suitably communicate with one another to process multi-modal natural language requests relating to the content dedication service (e.g., the virtual router 660 may communicate with the voice-enabled server 640 through another messaging interface distinct from the messaging interface 650 for communicating with the voice-enabled client device 610, as shown in the exemplary system illustrated in FIG. 2).

In one implementation, the system shown in FIG. 6 may provide the natural language content dedication service to any suitable voice-enabled client device 610 having a suitable combination of input and output devices 615a that can receive natural language multi-modal interactions and provide responses to the natural language multi-modal interactions, wherein the input and output devices 615a may be further arranged to receive any other suitable type of input and provide any other suitable type of output. For example, in one implementation, the voice-enabled client device 610 may comprise a mobile phone that includes a keypad input device 615a, a touch screen input device 615a, or other input mechanisms 615a in addition to any input microphones or other suitable input devices 615a that can receive voice signals. As such, in this example, the mobile phone may further include an output display device 615a in addition to any output microphones or other suitable output devices 615a that can output audible signals. Thus, a user of the voice-enabled client device 610 may be listening to music, watching video, or otherwise interacting with content through the input and output devices 615a and provide a multi-modal natural language request to engage in a transaction to dedicate the music, video, or other content, as will be described in greater detail below. Furthermore, in one implementation, the voice-enabled client device 610 may be included within a hybrid processing environment that may include a plurality of different devices, whereby the content dedication request may relate to content played on a different device from the voice-enabled client device 610, although the content dedication request may relate to any suitable content (i.e., the request need not necessarily relate to played content, as users may provide natural language to request content dedications for any suitable content).

Thus, in one implementation, in response to the voice-enabled client device 710 receiving a multi-modal interaction that includes a natural language utterance, the voice-enabled client device 610 may invoke an Automatic Speech Recognizer (ASR) 620a to generate one or more preliminary interpretations of the utterance. The ASR 620a may then provide the preliminary interpretations to a conversational language processor 630a, which may attempt to determine an intent for the multi-modal interaction. In one implementation, to determine the intent for the multi-modal interaction, the conversational language processor 630a may determine a most likely context for the interaction from the preliminary interpretations of the utterance, any accompanying non-speech inputs in the multi-modal interaction that relate to the utterance, contexts associated with prior requests, short-term and long-term shared knowledge, or any other suitable information for interpreting the multi-modal interaction. Thus, in response to the conversational language processor 630a determining that the intent for the multi-modal interaction relates to a content dedication request, a content dedication application 634a may be invoked to resolve the content dedication request.

For example, in one implementation, an initial multi-modal interaction may include the utterance "Find 'Superstylin'" by Groove Armada." In response to the initial multi-modal interaction, the ASR 620a may generate a preliminary interpretation that includes the words "Find" and "Superstylin" and the phrase "Groove Armada." The ASR 620a may then provide the preliminary interpretation to the conversational language processor 630a, which may determine that the word "Find" indicates that the most likely intent of the interaction includes a search, while the word "Superstylin" and the phrase "Groove Armada" provide criteria for the search. Furthermore, in response to determining the most likely intent of the interaction, the conversational language processor 630a may establish a music context for the interaction and attempt to resolve the search request. For example, the conversational language processor 630a may search one or more data repositories 636a that contain music information to identify music having a song title of "Superstylin" and an artist name of "Groove Armada," and the conversational language processor 630a may further cooperate with other devices in the hybrid processing environment to search for the song (e.g., in response to the local data repositories 636a not yielding adequate results, another device in the environment having a larger music data repository than the client device 610 may be invoked). The conversational language processor 630a may then receive appropriate results for the search and present the results to the user through the output device 615a (e.g., displaying information about the song, playing a sample audio clip of the song, displaying options to purchase the song, recommending similar songs or similar artists, etc.).

Continuing with the above example, a subsequent multi-modal interaction may include the utterance "Share this with my wife," "Dedicate it to Charlene," "That's the one, I want to pass along to some friends," or another suitable utterance that reflects a request to dedicate the content. Alternatively (or additionally), in response to the intent of the initial interaction including a request to search for content, the conversational language processor 630a may invoke the content dedication application 634a, which may present an option to dedicate the content through the output device 615a together with the results of the search. As such, the request to dedicate the content may also be provided in a non-speech input, such as a button press or touch screen selection of the option to dedicate the content. Accordingly, in response to detecting a content dedication request (e.g., through the ASR 620a and the conversational language processor 630a processing a suitable utterance, the input device 615a receiving a suitable non-speech input, or any suitable combination thereof), the content dedication application 634a may be invoked to process the content dedication request.

In one implementation, to process the content dedication request, the content dedication application 634a may capture a natural language utterance that contains the dedication. For example, the content dedication application 634a may provide a prompt through the output device 615a that instructs the user to provide the dedication utterance (e.g., a visual or audible prompt instructing the user to begin speaking, to speak after an audible beep, etc.). The user may then provide the dedication utterance through the voice-enabled input device 615a, and the dedication utterance may then be converted into an electronic signal that the content dedication application 634a captures for the dedication (e.g., "Dear Charlene, I was listening to this song and I thought of you. Enjoy!"). In addition, the content dedication application 634a may further prompt the user to provide any additional tags for the dedicated content (e.g., an image or a picture to be inserted as album art for the dedicated content, a natural language utterance that includes information to be inserted as voice-tags for the dedicated content, a non-speech input or data input that includes information to insert in tags for the dedicated content, etc.). The content dedication application 634a may then prompt the user to identify a recipient 690 of the dedication, wherein the user may provide any suitable multi-modal input that includes an e-mail address, a telephone number, an address book entry, or other information identifying the recipient 690 of the dedication.

In one implementation, the content dedication application 634a may then route the request, including the dedication utterance, the additional tags (if any), and the information identifying the recipient 690 to the content dedication system 665 through the messaging interface 650. For example, the dedication utterance may be converted into encoded audio that can be communicated through the messaging interface 650, whereby the content dedication system 665 can insert the encoded audio corresponding to the dedication utterance within the dedicated content and/or verbally annotate the dedicated content with the encoded audio. Alternatively (or additionally), the dedication utterance may be interpreted and parsed to transcribe one or more words or phrases from the dedication utterance, wherein the transcribed words or phrases may provide a textual annotation for the dedicated content (e.g., the textual annotation may be inserted within metadata for the dedicated content, such as an ID3 Comments tag). Similarly, any utterances to be inserted as voice-tags for the dedicated content may provide further verbal annotations for the dedicated content, or such utterances may be transcribed to provide further textual annotations for the dedicated content. In one implementation, verbal annotations, textual annotations, and other types of annotations may be created and associated with the dedicated content using techniques described in co-pending U.S. patent application Ser. No. 11/212,693, entitled "Mobile Systems and Methods of Supporting Natural Language Human-Machine Interactions," filed Aug. 29, 2005, the contents of which are hereby incorporated by reference in their entirety.

In one implementation, in response to the content dedication system 665 receiving the content dedication request, the dedication utterance, and any additional tags from the content dedication application 634a, the content dedication system 665 may invoke a similar content dedication application 634b on the voice-enabled server 640 to process the request. In particular, the content dedication application 634b on the voice-enabled server 640 may identify the content requested for dedication and initiate a transaction for the content requested for dedication. For example, in one implementation, if the content dedication application 634a on the voice-enabled client device 610 was able to identify the requested content, the content dedication request received at the content dedication system 665 may include an identification of the content to be dedicated. Alternatively, because the content dedication system 665 can cooperate in resolving the multi-modal interactions involved in the dedication request, the content dedication system 665 may use shared knowledge relating to the dedication request to identify the content to be dedicated. For example, the content dedication system 665 may invoke one or more local natural language processing components (e.g., ASR 620b, conversational language processor 630b or 630c, etc.), search one or more local data repositories 636b, interact with one or more content providers 680 over a network 670, pull data from a satellite radio system that played the requested content at the voice-enabled client device 610 or another device in the hybrid processing environment, or otherwise consult available resources that can be used to identify the content to be dedicated.

In one implementation, in response to identifying the content to be dedicated, the content dedication system 665 may communicate with a billing system 638 to identify one or more purchase options for the dedication request and process an appropriate transaction for the dedication request. In particular, the content dedication system 665 may generally support various different purchase options to provide users with flexibility in the manner of requesting content dedications, including a buy-to-own purchase option, a pay-to-play purchase option, a paid subscription purchase option, or other appropriate options. In one implementation, the purchase options may be modeled on techniques for providing natural language services and subscriptions described in U.S. patent application Ser. No. 10/452,147, entitled "Systems and Methods for Responding to Natural Language Speech Utterance," which issued as U.S. Pat. No. 7,398,209 on Jul. 8, 2008, and co-pending U.S. patent application Ser. No. 10/618,633, entitled "Mobile Systems and Methods for Responding to Natural Language Speech Utterance," filed Jun. 15, 2003, the contents of which are hereby incorporated by reference in their entirety. For example, in the buy-to-own purchase option, the content dedication system 665 may purchase full rights to the content from an appropriate content provider 680, wherein the billing system 638 may then charge the user of the voice-enabled client device 610 a particular amount that encompasses the cost for purchasing the content from the content provider 680 plus a service charge for dedicating the content, tagging the dedicated content, delivering the dedicated content to the recipient 690, or any other appropriate services rendered for the content dedication request. The billing system 638 may charge the user in a similar manner under the pay-to-play purchase option, except that the rights purchased from the content provider 680 may be limited to a single play, such that the cost for purchasing the content from the content provider 680 may be somewhat less under the pay-to-play purchase option.

Under the paid subscription purchase option, however, the user may pay a periodic service charge to the content dedication system 665 that permits the user to make a predetermined number of content dedications or an unlimited number of content dedications in a subscription period, or the subscription purchase option may permit the user to make content dedications in any other suitable manner (e.g., different subscription levels having different content dedication options may be offered, such that the user may select a subscription level that meets the user's particular needs). For example, under the paid subscription purchase option, the billing system 638 may only charge the user any costs for obtaining the rights to the content, which may be purchased under either the buy-to-own option or the pay-to-play option, or alternatively the user may be charged nothing if the user already owns the dedication content. In another example, a first subscription level may cost a first amount to permit the user to make a particular number of content dedications in a subscription period, while a second subscription level may cost a higher amount to permit the user to make an unlimited number of content dedications in the subscription period, while still other subscription levels having different terms may be offered, as will be apparent.

Furthermore, in one implementation, a service provider associated with the content dedication system 665 may negotiate an agreement with the content provider 680 to determine the manner in which revenues for content transactions will be shared between the content dedication system 665 and the content provider 680. For example, the agreement may provide that the content provider 680 may keep all of the revenue for transactions that include purchasing content from the content provider 680 and that the service provider associated with the content dedication system 665 may recoup costs for such transactions from users. In another example, the agreement may provide that the content provider 680 and the service provider associated with the content dedication system 665 may share the revenue for the transactions that include purchasing content from the content provider 680. Thus, the agreement may generally include any suitable arrangement that defines the manner in which the content provider 680 and the service provider associated with the content dedication system 665 manage the revenue for the transactions that include purchasing content from the content provider 680, while the service provider associated with the content dedication system 665 may manage billing users for the natural language aspects of the content dedication service according to the techniques described in further detail above.

Figure 7:
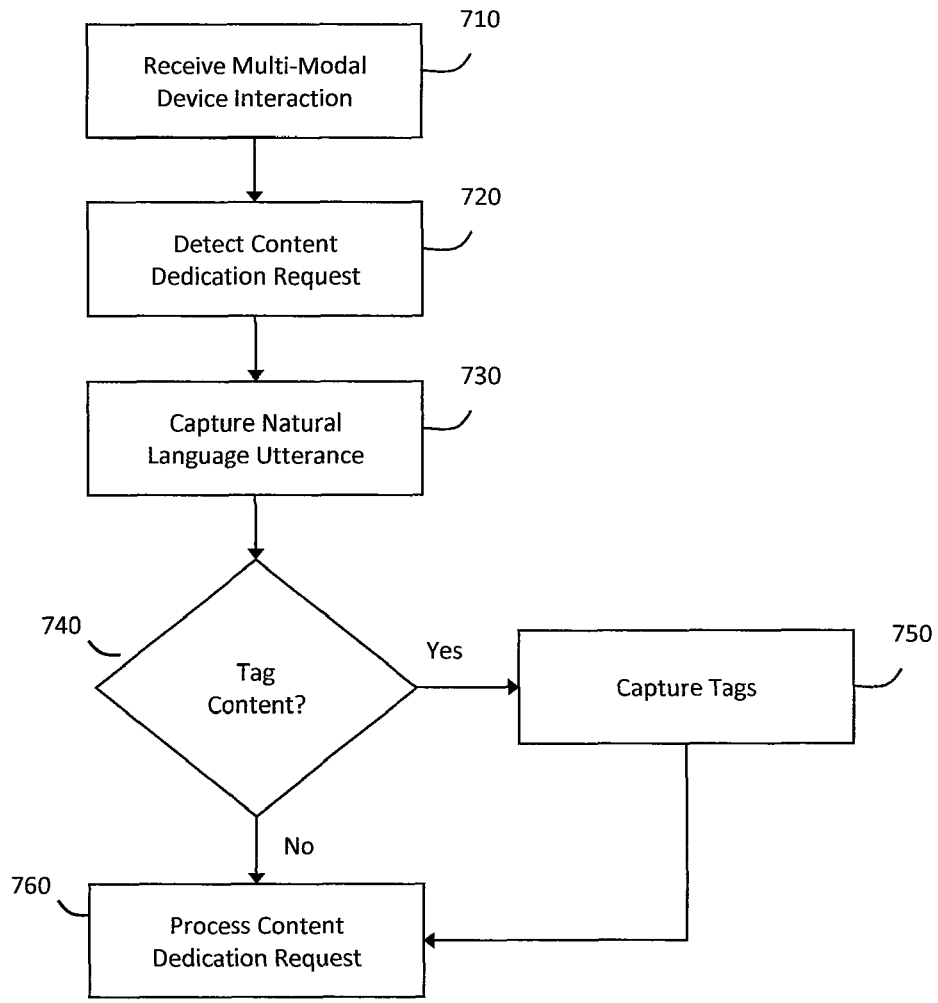
FIGS. 7-8 illustrate flow diagrams of exemplary methods for providing a natural language content dedication service, according to one aspect of the invention.

According to one aspect of the invention, FIG. 7 illustrates a flow diagram of an exemplary method for providing a natural language content dedication service. In particular, the method for providing a natural language content dedication service, as shown in FIG. 7, may be performed on a voice-enabled client device that can communicate with a content dedication system through a messaging interface, wherein the voice-enabled client device may communicate with the content dedication system in a similar manner as described above with reference to FIGS. 2 through 6. For example, the content dedication system may include a virtual router and a voice-enabled server that can service multi-modal natural language requests provided to the voice-enabled client device, and may further include a billing system for processing transactions relating to the content dedication service.

In one implementation, the method shown in FIG. 7 may be used to provide the natural language content dedication service to any suitable voice-enabled client device having a suitable combination of input and output devices that can receive natural language multi-modal interactions and provide responses to the natural language multi-modal interactions, wherein the input and output devices may be further arranged to receive any other suitable type of input and provide any other suitable type of output. For example, in one implementation, the voice-enabled client device may comprise a mobile phone that includes a keypad input device, a touch screen input device, or other input mechanisms in addition to any input microphones or other suitable input devices that can receive voice signals, and may further include an output display device in addition to any output microphones or other suitable output devices that can output audible signals. Thus, a user of the voice-enabled client device may be listening to music, watching video, or otherwise interacting with content through the input and output devices, wherein an operation 710 may include the voice-enabled client device receiving a multi-modal natural language interaction to engage in a transaction to dedicate the music, video, or other content.

Thus, in one implementation, in response to the voice-enabled client device receiving the multi-modal interaction in operation 710 that includes a natural language utterance, the voice-enabled client device may invoke an Automatic Speech Recognizer (ASR) to generate one or more preliminary interpretations of the utterance. The ASR may then provide the preliminary interpretations to a conversational language processor, which may attempt to determine an intent for the multi-modal interaction. In one implementation, to determine the intent for the multi-modal interaction, the conversational language processor may determine a most likely context for the interaction from the preliminary interpretations of the utterance, any accompanying non-speech inputs in the multi-modal interaction that relate to the utterance, contexts associated with prior requests, short-term and long-term shared knowledge, or any other suitable information for interpreting the multi-modal interaction. Thus, in one implementation, an operation 720 may include the conversational language processor detecting a content dedication request in response to determining that the intent for the multi-modal interaction relates to a content dedication request. The conversational language processor may then invoke a content dedication application to resolve the content dedication request.

For example, in one implementation, the multi-modal interaction received in operation 720 may include the utterance "Buy that song and send it to Michael." In response to the initial multi-modal interaction, the ASR may generate a preliminary interpretation that includes words and/or phrases such as "Buy," "that song," "send it," and "to Michael." The ASR may then provide the preliminary interpretation to the conversational language processor, which may determine that the word and/or phrase combination of "Buy" and "send it" indicates that the most likely intent of the interaction includes a content dedication request, while the word and/or phrase combination of "that song" and "to Michael" provide criteria for the intended content and recipient for the dedication. Furthermore, in response to determining the most likely intent of the interaction, the conversational language processor may establish a device context, a dedication context, a content or music context, an address book context, or other suitable contexts in an attempt to resolve the request.

For example, the device context may enable the conversational language processor to retrieve data from the voice-enabled client device or another suitable device that provides the user's intended meaning for the phrase "that song" (e.g., the user may be referring to a song playing on the user's satellite radio device, such that the conversational language processor can identify the song that was playing when the device interaction was received in operation 710). Furthermore, the address book context may enable the conversational language processor to identify "Michael," the intended recipient of the dedication request. The conversational language processor may then receive appropriate results for resolving the intent of the request and present the results to the user through the output device (e.g., displaying information requesting that the user confirm that the content and recipient was correctly identified, playing a sample audio clip of the song, displaying options to purchase the song, recommending similar songs or similar artists, etc.). Accordingly, in response to detecting the content dedication request in operation 720 and identifying the relevant criteria identifying the content to be dedicated and the intended recipient, the content dedication application may be invoked to process the content dedication request.

For example, in one implementation, processing the content dedication request may include the content dedication application capturing a natural language utterance that contains the dedication for the requested content in an operation 730. For example, the content dedication application may provide a prompt through the output device that instructs the user to provide the dedication utterance (e.g., a visual or audible prompt instructing the user to begin speaking, to speak after an audible beep, etc.). The user may then provide the dedication utterance through the voice-enabled input device, and the dedication utterance may then be converted into an electronic signal that the content dedication application captures in operation 730. In addition, an operation 740 may include the content dedication application further prompting the user to provide any additional tags for the dedicated content (e.g., an image or a picture to be inserted as album art for the dedicated content, one or more natural language utterances to insert as voice-tags for the dedicated content, one or more natural language utterances to be transcribed into text that can be inserted in tags for the dedicated content, a non-speech input or data input that include information to insert in tags for the dedicated content, etc.).

Thus, in response to determining that the user has provided additional information to insert in tags for the dedication content in operation 740, the content dedication application may then capture the tags in an operation 750. For example, operation 750 may include the content dedication application capturing an image or picture that the user identifies for album art to be inserted in the dedicated content, capturing any natural language utterances to insert as voice-tags for the dedicated content, communicating with the ASR and/or conversational language processor to transcribe any natural language utterances to be inserted as text within tags for the dedicated content, capturing any non-speech inputs or data inputs that include information to insert as text within the tags for the dedicated content, or otherwise capturing information that relates to the additional tags.

In one implementation, the content dedication application may then process the content dedication request in an operation 760, which may include prompting the user to identify the recipient of the dedication. For example, the content dedication application may request information identifying the recipient of the dedication in response to the user not having already identified the recipient, in response to the user identifying the recipient in a manner that includes ambiguity or other criteria that cannot be resolved without further information, to distinguish among different contact information known for the recipient, or in response to other appropriate circumstances. Thus, the user may provide any suitable multi-modal input that includes an e-mail address, a telephone number, an address book entry, or other criteria that can be used to uniquely identify the information for contacting the recipient of the dedication. Furthermore, in one implementation, processing the content dedication request in operation 760 may further include the content dedication application routing the request, including the dedication utterance, the additional tags (if any), and the information for contacting the recipient to the content dedication system through the messaging interface, wherein the content dedication system may then process a transaction for the content dedication request, as will be described in greater detail below.

Figure 8:
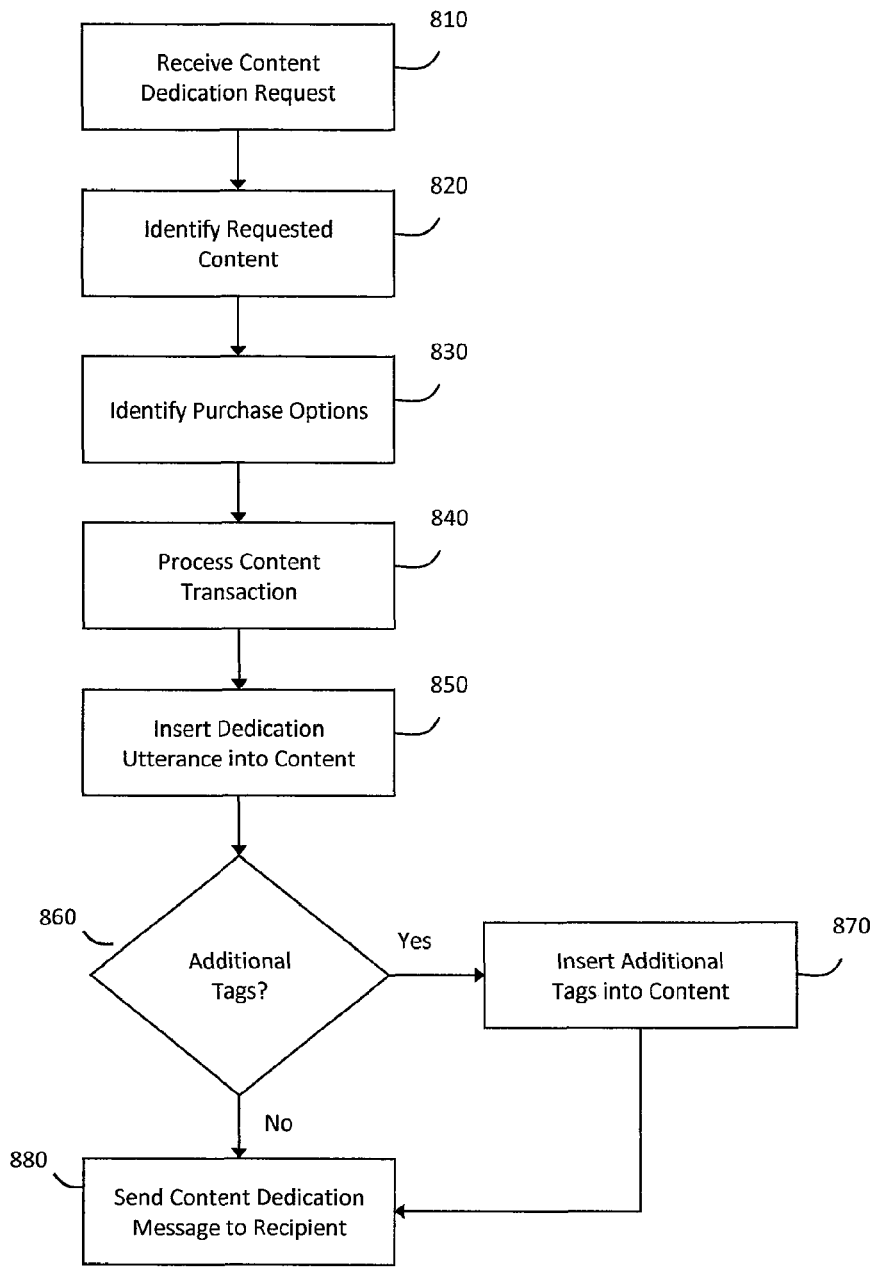

According to one aspect of the invention, FIG. 8 illustrates a flow diagram of an exemplary method for providing a natural language content dedication service. In particular, the method for providing a natural language content dedication service, as shown in FIG. 8, may include an operation 810 in which a content dedication system may receive a natural language content dedication request through a messaging interface. For example, in one implementation, the content dedication system may receive the natural language content dedication request from a content dedication application that executes on a voice-enabled client device. In one implementation, the natural language content dedication request received in operation 810 may generally include a natural language dedication utterance, information to be inserted within one or more tags for content to be dedicated, and information identifying a recipient of the dedicated content.

For example, in one implementation, the dedication utterance received in operation 810 may include encoded audio that the content dedication system can insert within the dedicated content or use to verbally annotate the dedicated content. Alternatively (or additionally), the content dedication system may interpret and parse the dedication utterance to transcribe one or more words or phrases from the dedication utterance, wherein the transcribed words or phrases may provide a textual annotation for the dedicated content (e.g., the textual annotation may be inserted within metadata for the dedicated content, such as an ID3 Comments tag). Similarly, any utterances to be inserted as voice-tags for the dedicated content may provide further verbal annotations for the dedicated content, or such utterances may be transcribed to provide further textual annotations for the dedicated content. In one implementation, verbal annotations, textual annotations, and other types of annotations may be created and associated with the dedicated content using techniques described in co-pending U.S. patent application Ser. No. 11/212,693, entitled "Mobile Systems and Methods of Supporting Natural Language Human-Machine Interactions," filed Aug. 29, 2005, the contents of which are hereby incorporated by reference in their entirety.

In one implementation, in response to the content dedication system receiving the content dedication request, the dedication utterance, and any additional tags from the content dedication application in operation 810, the content dedication system may invoke a content dedication application on a voice-enabled server to process the content dedication request. In particular, an operation 820 may include the content dedication application on the voice-enabled server identifying the content requested for dedication. In one implementation, the request received from the content dedication application in operation 810 may include information identifying the requested content and/or information that the content dedication system can use to identify the requested content. For example, the request may include a multi-modal natural language input that includes a natural language utterance and/or a non-voice input, wherein the content dedication system may use shared knowledge relating to the dedication request to identify the content to be dedicated.

Thus, operation 820 may include the content dedication system invoking one or more natural language processing components (e.g., an ASR, a conversational language processor, etc.), searching one or more data repositories, interacting with one or more content providers, pulling data from a satellite radio system that played the requested content at the voice-enabled client device or another device in a hybrid processing environment, or otherwise consulting available resources that can be used to identify the content to be dedicated. For example, in one implementation, the hybrid processing environment may include a device having an application that can identify played content (e.g., a Shazam® listening device that a user can hold near a speaker to identify content playing through the speaker). Thus, operation 820 may generally include the content dedication system communicating with any suitable device, system, application, or other resource to identify the content requested for dedication.

In one implementation, in response to identifying the content to be dedicated, an operation 830 may include the content dedication system identifying one or more purchase options for the dedication request. In one implementation, operation 830 may include the content dedication system communicating with a billing system that supports various purchase options to provide users with flexibility in the manner of requesting content dedications. For example, the billing system may support content dedication purchase options that include a buy-to-own purchase option, a pay-to-play purchase option, a paid subscription purchase option, or other appropriate options. In response to identifying the purchase option for the content dedication request, an operation 840 may include the content dedication system processing a transaction for the content identified in operation 820.

For example, in response to operation 830 indicating that the user has selected the buy-to-own purchase option, the transaction processed in operation 840 may include purchasing full rights to the requested content from an appropriate content provider, wherein the billing system may then charge the user of the voice-enabled client device an appropriate amount that includes costs for purchasing the content from the content provider, adding the natural language utterance dedicating the content, tagging the dedicated content, delivering the dedicated content to the recipient, or any other appropriate services rendered for the content dedication request. Alternatively, in response to operation 830 indicating that the user has selected the pay-to-play purchase option, the transaction processed in operation 840 may include purchasing rights from the content provider that permits the purchased content to be played a predetermined number of times, wherein the billing system may charge the user in a similar manner as described above, except that the cost for purchasing limited rights to the content under the pay-to-play purchase option may be somewhat less than the cost for purchasing ownership rights to the content, as in the buy-to-own purchase option.

In another alternative implementation, in response to determining that the requested content dedication includes a selection of the paid subscription purchase option, the user may pay a periodic service charge to the content dedication system that permits the user to make a predetermined number of content dedications in a subscription period, an unlimited number of content dedications in the subscription period, or otherwise make content dedications in accordance with terms defined in a subscription (e.g., different subscription levels having different content dedication options may be offered, such as a subscription level that only permits utterance dedications, another subscription level that further permits interpreting and parsing utterance dedications, etc.). Thus, the content transaction may be processed in operation 840 according to the purchase options identified in operation 830, and the content dedication system may then further process the dedication request to customize the dedicated content according to criteria provided in the request previously received in operation 810.

For example, in one implementation, an operation 850 may include the content dedication system inserting the natural language dedication utterance into the dedicated content, verbally annotating the dedicated content with the dedication utterance, or otherwise associating the dedicated content with the dedication utterance. Furthermore, an operation 860 may include the content dedication system determining whether any additional tags have been specified for the dedicated content. For example, as noted above, the dedication request may identify an image or picture to insert as album art for the dedicated content, one or more natural language utterances, non-voice, and/or data inputs to be transcribed into text that can be inserted in tags for the dedicated content, or any other suitable information that can be inserted within or associated with metadata for the dedicated content. Thus, in response to determining that information for any additional tags has been provided, an operation 870 may include inserting such additional tags into the dedicated content.

In one implementation, in response to having purchased the content requested for dedication, associating the dedication utterance with the dedicated content, and associating the additional tags (if any) with the dedicated content, the content dedication system may send a content dedication message to the recipient of the dedication in an operation 880. For example, the content dedication message may include a Short Message Service (SMS) text message, an electronic mail message, an automated telephone call managed by a text-to-speech engine, or any other appropriate message that can be appropriately delivered to the recipient (e.g., the message may include a link that the recipient can select to stream, download, or otherwise access the dedicated content, the dedication utterance, etc.). Thus, the content dedication message may generally notify the recipient that content has been dedicated to the recipient and provide various mechanisms for the recipient to access the content dedication, as will be apparent.

Implementations of the invention may be made in hardware, firmware, software, or various combinations thereof. The invention may also be implemented as instructions stored on a machine-readable medium, which may be read and executed by one or more processors. A machine-readable medium may include various mechanisms for storing or transmitting information in a form readable by a machine (e.g., a computing device). For example, a machine-readable storage medium may include read only memory, random access memory, magnetic disk storage media, optical storage media, flash memory devices, or other storage media, and a machine-readable transmission media may include forms of propagated signals, such as carrier waves, infrared signals, digital signals, or other transmission media. Further, firmware, software, routines, or instructions may be described in the above disclosure in terms of specific exemplary aspects and implementations of the invention, and performing certain actions. However, it will be apparent that such descriptions are merely for convenience, and that such actions in fact result from computing devices, processors, controllers, or other devices executing the firmware, software, routines, or instructions.

Accordingly, aspects and implementations of the invention may be described herein as including a particular feature, structure, or characteristic, but it will be apparent that every aspect or implementation may or may not necessarily include the particular feature, structure, or characteristic. In addition, when a particular feature, structure, or characteristic has been described in connection with a given aspect or implementation, it will be understood that such feature, structure, or characteristic may be included in connection with other aspects or implementations, whether or not explicitly described. Thus, various changes and modifications may be made to the preceding description without departing from the scope or spirit of the invention, and the specification and drawings should therefore be regarded as exemplary only, with the scope of the invention determined solely by the appended claims.

What is claimed is:

1. A system for providing a natural language content dedication service, comprising:
    one or more processors; and
    one or more non-transitory computer readable mediums storing executable instructions that when executed by the one or more processors cause the one or more processors to:
        receive a first utterance that includes a natural language utterance;
        determine, based on processing of the first utterance by a speech recognition engine, one or more words or phrases of the first utterance;
        provide the one or more words or phrases as an input to a conversational language processor;
        interpret the first utterance, at the conversational language processor, based on the one or more words or phrases;
        identify, based on the interpretation of the first utterance, content to dedicate to a recipient;
        initiate, based on the identified content, a dedication to the recipient;
        receive a second utterance to be associated with the dedication;
        determine, based on a processing of the second utterance by the speech recognition engine, one or more words or phrases of the second utterance;
        provide the one or more words or phrases of the second utterance as textual annotations within metadata of the content; and
        send information to enable the recipient to access the content and the second utterance.

2. The system of claim 1, wherein the executable instructions, when executed by the one or more processors, cause the one or more processors to provide an image as one or more tags within metadata of the content.

3. The system of claim 1, wherein the executable instructions, when executed by the one or more processors, cause the one or more processors to annotate the content with the second utterance.

4. The system of claim 1, wherein the executable instructions, when executed by the one or more processors, cause the one or more processors to purchase the content from a content provider to enable the recipient to access the content.

5. The system of claim 4, wherein the executable instructions, when executed by the one or more processors, cause the one or more processors to:
    identify, for the dedication, a purchase option that includes one or more of a buy-to-own purchase option, a pay-to-play purchase option, or a paid subscription purchase option; and
    bill a user associated with the first utterance based on the purchase option.

6. The system of claim 1, wherein the executable instructions, when executed by the one or more processors, cause the one or more processors to: send, to the recipient, an electronic link to access the content as the information to enable the recipient to access the content; and
    send, to the recipient, the second utterance in an encoded audio format as the information to enable the recipient to access the second utterance.

7. The system of claim 1, wherein the content includes one or more of a song or a video.

8. A method for providing a natural language content dedication service, the method being implemented in a computer system having one or more processors programmed with computer program instructions that, when executed by the one or more processors, cause the computer system to perform the method, the method comprising:
    receiving, by one or more processors, a first utterance that includes a natural language utterance;
    determining, by the one or more processors, one or more words or phrases of the first utterance based on processing of the first utterance by a speech recognition engine;
    providing, by the one or more processors, the one or more words or phrases as an input to a conversational language processor;
    interpreting, by the one or more processors, the first utterance, at the conversational language processor, based on the one or more words or phrases;
    identifying, by the one or more processors, content to dedicate to a recipient based on the interpretation of the first utterance;
    initiating, by the one or more processors, a dedication to the recipient based on the identified content;
    receiving, by the one or more processors, a second utterance to be associated with the dedication;
    determining, by the one or more processors, one or more words or phrases of the second utterance based on a processing of the second utterance by the speech recognition engine;
    providing, by the one or more processors, the one or more words or phrases of the second utterance as textual annotations within metadata of the content; and
    sending, by the one or more processors, information to enable the recipient to access the content and the second utterance.

9. The method of claim 8, further comprising providing an image as one or more tags within metadata of the content.

10. The method of claim 8, further comprising annotating the content with the second utterance.

11. The method of claim 8, further comprising purchasing the content from a content provider to enable the recipient to access the content.

12. The method of claim 11, further comprising:
    identifying, for the dedication, a purchase option that includes one or more of a buy-to-own purchase option, a pay-to-play purchase option, or a paid subscription purchase option; and billing a user associated with the first utterance based on the purchase option.

13. The method of claim 8, further comprising: sending, to the recipient, an electronic link to access the content as the information to enable the recipient to access the content; and sending, to the recipient, the second utterance in an encoded audio format as the information to enable the recipient to access the second utterance.

14. The method of claim 8, wherein the content includes one or more of a song or a video.

15. The system of claim 1, wherein the executable instructions, when executed by the one or more processors, cause the one or more processors to:

determine that a user is interacting with a media item; and identify, based on the natural language processing and the interaction of the user with the media item, the media item as the content to dedicate to the recipient.

16. The system of claim 1, wherein the executable instructions, when executed by the one or more processors, cause the one or more processors to:

determine a media item that a user is playing;

determine that the user provided the first utterance during the playing of the media item by the user; and identify, based on the natural language processing and the determination that the user provided the first utterance during the playing of the media item, the media item as the content to dedicate to the recipient.

17. The system of claim 1, wherein the executable instructions, when executed by the one or more processors, cause the one or more processors to provide an electronic link associated with the content as one or more tags within metadata of the content.

18. The system of claim 1, wherein the executable instructions, when executed by the one or more processors, cause the one or more processors to provide a voice tag as one or more tags within metadata of the content.

19. The system of claim 1, wherein the executable instructions, when executed by the one or more processors, cause the one or more processors to provide the second utterance within the content.

* * * * *